(12) United States Patent
Yamauchi et al.

(10) Patent No.: US 6,668,792 B2
(45) Date of Patent: Dec. 30, 2003

(54) CONTROL SYSTEM FOR IN-CYLINDER DIRECT INJECTION ENGINE

(75) Inventors: Takeo Yamauchi, Hiroshima (JP); Masayuki Tetsuno, Hiroshima (JP); Kiyotaka Mamiya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 58 days.

(21) Appl. No.: 10/097,669

(22) Filed: Mar. 15, 2002

(65) Prior Publication Data

US 2002/0134346 A1 Sep. 26, 2002

(30) Foreign Application Priority Data

Mar. 21, 2001 (JP) .......... 2001-080055
Dec. 10, 2001 (JP) .......... 2001-375557

(51) Int. Cl.⁷ .......... F02B 17/00; F02B 23/10; F02B 31/00
(52) U.S. Cl. .......... 123/295; 123/301; 123/305
(58) Field of Search .......... 123/295, 305, 123/301

(56) References Cited

U.S. PATENT DOCUMENTS

| | | | |
|---|---|---|---|
| 5,967,113 A | * 10/1999 | Kaneko et al. | 123/295 |
| 6,101,998 A | * 8/2000 | Tamura et al. | 123/295 |
| 6,199,534 B1 | 3/2001 | Tokuyasu et al. | |
| 6,390,057 B2 | * 5/2002 | Yoshizawa et al. | 123/295 |

FOREIGN PATENT DOCUMENTS

JP  2000-204954 A  7/2000

* cited by examiner

Primary Examiner—Henry C. Yuen
Assistant Examiner—Arnold Castro
(74) Attorney, Agent, or Firm—Nixon Peabody LLP; Donald R. Studebaker

(57) ABSTRACT

In a control system for an in-cylinder direct injection engine, an actual port intake air density ganmap is calculated based on the intake air temperature thae and the atmospheric pressure atp, a reference port intake air density ganmap* corresponding to the current operating conditions of the engine is read out of a map and compared with the actual port intake air density ganmap, and a target fuel pressure or fuel injection timing is compensatorily modified based on the comparison result. This prevents fuel spray and the tumble from being thrown out of balance due to a change in intake air temperature or atmospheric pressure thereby providing suitable mixture stratification.

16 Claims, 22 Drawing Sheets

CONTROL SYSTEM FOR IN-CYLINDER DIRECT INJECTION ENGINE

BACKGROUND OF THE INVENTION a. Field of the Invention

This invention relates to a control system for an in-cylinder direct injection engine which controls the behavior of fuel spray, directly injected into a combustion chamber in a cylinder, with a tumble to combust a mixture stratified around an electrode of a spark plug, and more particularly relates to the technical field of compensation control for compensating an influence on combustion quality of the mixture resulting from intake air density conditions different than desired.

b. Description of the Prior Art

Conventionally, control systems for in-cylinder direct injection engines of this type include one which is adapted to control the penetration of fuel spray from an injector in accordance with the intensity of a tumble, carry the fuel spray toward a spark plug by means of the tumble and stratify a mixture around an electrode of the spark plug, as disclosed in, for example, Japanese Unexamined Patent publication No. 2000-204954.

Specifically, in the above control system, a tumble control valve (TCV) is provided in an intake passage of the engine downstream of a throttle valve. The TCV is opened or closed by an actuator to control the intensity of the tumble in the combustion chamber. At the same time, the fuel injection pressure of the injector is correspondingly controlled so that the fuel spray penetration is balanced against the tumble. In this manner, the fuel spray from the injector is carried by means of the tumble to reach the vicinity of the electrode of the spark plug, which enables stable stratified combustion.

More specifically, the fuel injection pressure of the injector is experimentally set in advance to change depending upon operating conditions of the engine, and stored as a control map. A value corresponding to the current operating conditions of the engine is read out as a target value for control from the map. Then, the fuel injection pressure of the injector (fuel pressure) is controlled to match the target value so that the fuel spray penetration is balanced against the tumble intensity. The fuel spray is thereby carried by means of the tumble to reach the vicinity of the electrode of the spark plug at the exact ignition timing of the cylinder.

In general, since the temperature of the engine is relatively high as compared with that in the air, the temperature conditions of an intake air taken in the combustion chamber is strongly affected by the engine temperature conditions. In addition, a change in temperature of the intake air involves a change in density thereof, which varies the energy of tumble in the combustion chamber. Therefore, even if attempt is made to control the fuel injection pressure of the injector in accordance with the preset map as in the above-mentioned prior art, the fuel spray and the tumble may be thrown out of balance depending upon the engine temperature conditions so that a mixture may be held against stratification, which invites inconveniences of deterioration in ignitability and combustion quality of the mixture.

Particularly in an engine that performs so-called EGR (Exhaust Gas Recirculation) by recirculating part of an exhaust gas to an intake system, the recirculation rate of exhaust gas to fresh air is generally changed in accordance with the engine operating conditions. This change in recirculation rate of high-temperature exhaust gas causes a significant variation in temperature conditions of the intake air. Accordingly, in the engine of this type, the above inconveniences are more pronounced.

Further, for example, in relatively low atmospheric pressure environments such as highlands, the air density is relatively low as compared with flatlands so that the energy of tumble becomes smaller than that in flatlands. Also in this case, like the above-mentioned prior art, a mixture is held against stratification if the fuel injection pressure of the injector is controlled only in accordance with a preset control map.

The present invention has been made in view of the foregoing points, is directed to a control system for an in-cylinder direct injection engine which controls the behavior of fuel spray with a tumble to provide suitable mixture stratification, and has its object of preventing the fuel spray and the tumble from being thrown out of balance due to a change in intake air temperature or atmospheric pressure and of providing suitable mixture stratification.

SUMMARY OF THE INVENTION

To attain the above object, in the present invention, when an engine is in operation, a value for density conditions of an intake air taken in a combustion chamber is detected, and at least one of the flow rate of ah tumble in the combustion chamber, the fuel injection pressure and the fuel injection timing is compensated so that the intensity of the tumble and the penetration of fuel spray are balanced one against another.

Specifically, a first aspect of the invention has as a precondition a control system (A) for an in-cylinder direct injection engine which includes: a fuel injection valve (18) for directly injecting a fuel into a combustion chamber (6) in a cylinder (2) of an engine (1); and tumble generating means (10) for generating a tumble in the combustion chamber (6), in which the fuel is injected against the tumble in the combustion chamber (6) by the fuel injection valve (18) during stratified-charge combustion operation of the engine (1) so that a flammable mixture stays in the vicinity of an electrode of a spark plug (16) at the ignition timing for the cylinder (2).

Also, the control system (A) further includes: intake air density detecting means (50a) for detecting a value for density conditions of an intake air taken in the combustion chamber (6); revolving speed detecting means (52) for detecting the revolving speed of the engine (1); intake air flow control means (34) for controlling the flow rate of the tumble in the combustion chamber (6); fuel pressure control means (20) for controlling the fuel injection pressure of the fuel injection valve (18); and control means (50) for controlling the fuel injection valve (18), the intake air flow control means (34) and the fuel pressure control means (20) based on a value detected by at least one of the intake air density detecting means (50a) and the revolving speed detecting means (52), wherein the control means (50) sets based on at least the engine revolving speed respective reference target values of the tumble flow rate, fuel injection pressure and fuel injection timing that correspond to the case where the value for density conditions of the intake air is equal to a preset reference value, and the control means (50) compensatorily modifies at least one of the reference target values based on a value for the difference between the value detected by the intake air density detecting means (50a) and the reference value.

First, according to part of the control system (A) which constitutes the precondition, the fuel is injected from the fuel injection valve (18) against a tumble generated by the tumble generating means (10) during stratified-charge combustion operation of the engine (1). In this case, the flow rate of the tumble, the fuel injection pressure and the fuel injection timing are basically controlled by the control means (50) based on at least the engine revolving speed. Therefore, if the intake air density is equal to the reference value, the penetration of fuel spray from the fuel injector (18) is balanced against the tumble so that a mixture is stratified around the electrode of the spark plug (16) at the exact ignition timing of the cylinder (2).

However, for example, if the engine (1) is in higher temperature conditions than normally it is, the intake air will be relatively high in temperature and thereby low in density. In such a case, the energy of tumble becomes relatively small so that the tumble and the fuel spray are thrown out of balance. This inhibits suitable stratification of the mixture and thereby impairs the ignitability and combustion quality thereof.

On the other hand, according to the above-mentioned characteristic structure of the invention, the value for density conditions of the intake air taken in the combustion chamber (6) of the cylinder (2) of the engine (1) is detected by the intake air density detecting means (50a), and at least one of the target values for controlling the tumble flow rate, the fuel injection pressure and the fuel injection timing, respectively, is compensatorily modified by the control means (50) to reduce the influence of an energy drop of the tumble, based on a value for the difference between the detected value and the reference value, i.e., if the detected value is a value indicating a lower density than the reference value (second aspect of the invention). Accordingly, a mixture can be suitably stratified as initially intended. This provides enhanced ignitability and combustion quality of the mixture and thereby provides well improved fuel economy and power output performance.

In a third aspect of the invention, the intake air density detecting means (50a) detects at least one of the intake air temperature, the atmospheric pressure and the rate at which an exhaust gas is recirculated to an intake system.

In this manner, a change in intake air density can precisely be detected based on the detected value of the intake air temperature or the atmospheric pressure. Alternatively, if the recirculation rate of exhaust gas is detected, a change in intake air temperature due to recirculation of high-temperature exhaust gas can be obtained based on the detected value. A change in intake air density can be accordingly detected.

In a fourth aspect of the invention, an intake air passage (30) of the engine (1) is connected with an end of an exhaust gas recirculation passage (43) for recirculating part of the exhaust gas from an exhaust system to an intake system, and the intake air density detecting means (50a) is configured to detect temperature conditions of the intake air downstream from a connecting point with the exhaust gas recirculation passage (43).

In this manner, the temperature conditions of the intake air, including influences due to recirculation of high-temperature exhaust gas to the intake air passage (30), can precisely be detected. Based on this detection result, a change in intake air density and further an out-of-balance relation between the tumble and the fuel spray can be detected.

In a fifth aspect of the invention, the control system (A) further includes: reference intake air density storage means in which reference values for density conditions of the intake air are stored in correspondence with different operating conditions of the engine (1); comparison means for comparing the reference value stored in the reference intake air density storage means with the value detected by the intake air density detecting means (50a); and compensation amount setting means (50d) for setting an amount of compensation for at least one of the tumble flow rate, the fuel injection pressure and the fuel injection timing based on the comparison result of the comparison means (50d).

With this arrangement, the reference values for intake air density conditions are first preset so as to correspond to respective operating conditions of the engine (1), and then stored in the reference intake air density storage means. When the engine (1) is in operation, the reference value corresponding to its current operating conditions is compared with the detected value of the intake density detecting means (50a) by the comparison means (50b), and based on the comparison result, the compensation amount setting means (50d) sets an amount of compensation for at least one of the target values of tumble flow rate, fuel injection pressure and fuel injection timing. In this manner, the amount of compensation at which the control means (50) should compensate can be set in accordance with the degree of unbalance between the tumble and the fuel spray, and suitable compensation control can be made to eliminate such unbalance in just proportions.

In a sixth aspect of the invention, the control means (50) is configured to compensatorily modify the target value of the tumble flow rate to a larger value than the reference target value thereof when the detected value of the intake density detecting means (50a) indicates a lower density than the reference value.

In this manner, even if the energy of tumble is reduced due to a drop in intake air density, the influence due to this energy drop can be alleviated by increasing the tumble flow rate. This provides suitable mixture stratification as initially intended thereby fully attaining the operations and effects of the first aspect of the invention.

In a seventh aspect of the invention, the control means (50) is configured to compensatorily modify the target value of the fuel injection pressure to a smaller value than the reference target value thereof when the detected value of the intake density detecting means (50a) indicates a lower density than the reference value.

In this manner, even if the energy of tumble is reduced due to a drop in intake air density, the energy of fuel spray traveling against the tumble is reduced so that they can be balanced one against another. This provides suitable mixture stratification as initially intended thereby fully attaining the operations and effects of the first aspect of the invention.

In an eighth aspect of the invention, the control system further includes fuel pressure detecting means (19a) for detecting the fuel injection pressure of the fuel injector (18), and wherein the control means (50) is configured to compensate the fuel injection timing of the fuel injector (18) to the retard side until the deviation between the modified target value of the fuel injection pressure and the detected value of the fuel pressure detecting means (19a) has reached a predetermined value or less.

In general, control on the fuel injection pressure involves delay in response. Therefore, until the fuel pressure has reached the target value, the tumble and fuel spray may be transiently thrown out of balance to deteriorate the ignitability and combustion quality of the mixture. In contrast, in this aspect of the invention, the fuel injection timing is compensated during such a delay in control on the fuel pressure so that the transient deterioration in mixture ignitability and combustion quality can be blocked. Specifically, when the intake air density is low and the energy of tumble is dropped, i.e., when the penetration of fuel spray is intense relative to the tumble, the injection timing is retarded to provide suitable mixture stratification.

In a ninth aspect of the invention, the control means (50) is configured to compensatorily modify the target value of the fuel injection timing to the retard side with respect to the reference target value when the detected value of the intake density detecting means (50a) indicates a lower density than the reference value.

In this case, if the energy of tumble is dropped due to a decrease in intake air density, the injection timing of a fuel to be injected against the tumble is retarded. Thus, even if the fuel spray has a relatively intense penetration, a mixture can be formed in the vicinity of the spark plug (16) electrode at a desired timing. This fully attains the operations and effects of the first aspect of the invention.

In a tenth aspect of the invention, when the detected value of the intake air density detecting means (50a) indicates a higher density than the reference value, the control means (50) compensatorily modifies at least one of the target values for the tumble flow rate, the fuel injection pressure and the fuel injection timing to reduce the influence of an energy rise of the tumble.

With this arrangement, the value for density conditions of an intake air taken in the combustion chamber (6) of the cylinder (2) of the engine (1) is detected by the intake air density detecting means (50a). When the detected value indicates a higher density than the reference value, at least one of the target values for control on the tumble flow rate, fuel injection pressure and fuel injection timing is compensatorily modified by the control means to reduce the influence of an energy rise of the tumble.

In this manner, even if the intake air density is higher than the reference value, a mixture can be suitably stratified as initially intended, which enhances the ignitability and combustion quality of the mixture and thereby provides fully improved fuel economy and power output performance.

In an eleventh aspect of the invention, the control means (50) in the tenth aspect is configured to compensatorily modify the target value of the tumble flow rate to a smaller value than the reference target value thereof when the detected value of the intake air density detecting means (50a) indicates a higher density than the reference value.

In this manner, even if the energy of tumble is raised due to an increase in intake air density, the influence of this energy rise can be alleviated by reducing the tumble flow rate. This provides suitable mixture stratification as initially intended thereby fully attaining the operations and effects of the tenth aspect of the invention.

In a twelfth aspect of the invention, the control means (50) in the tenth aspect is configured to compensatorily modify the target value of the fuel injection pressure to a larger value than the reference target value thereof when the detected value of the intake density detecting means (50a) indicates a higher density than the reference value.

In this manner, even if the energy of tumble is raised due to an increase in intake air density, the energy of fuel spray traveling against the tumble is increased so that they can be balanced one against another. This provides suitable mixture stratification as initially intended thereby fully attaining the operations and effects of the tenth aspect of the invention.

In a thirteenth aspect of the invention, the control system further includes fuel pressure detecting means (19a) for detecting the fuel injection pressure of the fuel injector (18), and wherein the control means (50) is configured to compensate the fuel injection timing of the fuel injector (18) to the advance side until the deviation between the modified target value of the fuel injection pressure and the detected value of the fuel pressure detecting means (19a) has reached a predetermined value or less.

Thus, until the fuel pressure has reached the target value because of delay in response to the control on the fuel pressure, the fuel injection timing is compensated so that the transient deterioration in mixture ignitability and combustion quality can be blocked.

In a fourteenth aspect of the invention, the control means (50) in the tenth aspect is configured to compensatorily modify the target value of the fuel injection timing to the advance side with respect to the reference target value when the detected value of the intake density detecting means (50a) indicates a higher density than the reference value.

In this case, if the energy of tumble is raised due to an increase in intake air density, the injection timing of a fuel to be injected against the tumble is advanced. Thus, even if the fuel spray has a relatively weak penetration, a mixture can be formed in the vicinity of the spark plug (16) electrode at a desired timing. This fully attains the operations and effects of the tenth aspect of the invention.

In a fifteenth aspect of the invention, an in-cylinder direct injection engine system includes: an intake port (10) capable of generating a tumble in a combustion chamber (6) of an engine (1); a fuel injection valve (18) for injecting a fuel against the tumble in the combustion chamber (6) during a compression stroke of the cylinder (2); an intake air temperature sensor (46) for detecting the temperature of an intake air taken in the combustion chamber (6); an atmospheric pressure sensor (47) for detecting the atmospheric pressure; a revolving speed sensor (52) for detecting the revolving speed of the engine; an intake air flow control valve (34) for controlling the flow rate of the tumble flowing in the combustion chamber (6); a regulator (27) for regulating the fuel pressure of the fuel to be supplied to the fuel injection valve (18); and a control unit (50) for controlling the opening of the intake air flow control valve (34), and the fuel injection timing and fuel pressure of the fuel injection valve (18) based on a signal output from at least one of the revolving speed sensor (52), the intake air temperature sensor (46) and the atmospheric pressure sensor (47).

Further, the control unit (50) sets based on at least the engine revolving speed respective reference target values of the tumble flow rate, fuel injection pressure and fuel injection timing that correspond to the case where a value for density conditions of the intake air is equal to a preset reference value, calculates the intake air density based on the detected values of the intake air temperature sensor (46) and the atmospheric pressure sensor (47), and compensatorily modifies at least one of the reference target values based on a value for the difference between the calculated value for the intake air density and the reference value.

Further, it is preferable that when the calculated value for the intake air density indicates a lower density than the reference value, the control unit (50) having the above structure compensatorily modifies at least one of the target values for the tumble flow rate, the fuel injection pressure and the fuel injection timing to reduce the influence of an energy drop of the tumble, and that when the calculated value for the intake air density indicates a higher density than the reference value, the control unit (50) compensatorily modifies at least one of the target values for the tumble flow rate, the fuel injection pressure and the fuel injection timing to reduce the influence of an energy rise of the tumble (sixteenth aspect of the invention)

With this structure, the same operations and effects as in the first aspect are exhibited.

As described so far, according to the first aspect of the invention, in the control system for an in-cylinder direct injection engine in which a tumble is generated to flow toward an injector in a combustion chamber of a cylinder during stratified-charge combustion operation of the engine and a fuel is injected against the tumble with a suitable penetration so that a flammable mixture which stays in the vicinity of the spark plug electrode is ignited at the exact ignition timing of the cylinder, a value for density conditions of the intake air taken in the combustion chamber in each cylinder is detected, and at least one of the tumble flow rate, the fuel injection pressure and the fuel injection timing is compensated based on the detected value so that the tumble intensity and the fuel spray penetration are substantially balanced one against another in the combustion chamber. Therefore, for example, even if the intake air temperature or the atmospheric pressure is changed and the energy of tumble thereby varies, the tumble and the fuel spray can be prevented from being thrown out of balance so that a mixture can be suitably stratified as initially intended. This enhances the ignitability and combustion quality of the mixture thereby providing well improved fuel economy and power output performance.

According to the second aspect of the invention, when the energy of tumble is dropped due to change in intake air temperature, atmospheric pressure and so on, the effects as in the first aspect can be fully obtained.

According to the third aspect of the invention, since the intake air density detecting means detects at least one of the intake air temperature, the atmospheric pressure and the recirculation rate of exhaust gas, a change in intake air density can precisely be detected based on the detected value in order to perform compensation control. It can be thereby prevented that the tumble and the fuel spray are thrown out of balance due to change in density conditions of the intake air.

According to the fourth aspect of the invention, since the intake air density detecting means detects temperature conditions of the intake air downstream from a connecting point with the exhaust gas recirculation passage, the temperature conditions of the intake air, including influences due to recirculation of high-temperature exhaust gas, can precisely be detected. Through compensation control based on this detection result, the tumble and the fuel spray can be prevented from being thrown out of balance.

According to the fifth aspect of the present invention, the detected value for density conditions of the intake air is compared with the reference value corresponding to the current engine operating conditions, and based on this comparison result, the amount of compensation of the control means is set. Therefore, in accordance with the degree of unbalance between the tumble and the fuel spray, suitable compensation control can be made to eliminate such unbalance in just proportions.

According to the sixth aspect of the invention, even if the energy of tumble is reduced due to a drop in intake air density, the influence due to this energy drop can be alleviated by increasing the tumble flow rate. This provides suitable mixture stratification as initially intended.

According to the seventh aspect of the invention, even if the energy of tumble is reduced due to a drop in intake air density, the energy of fuel spray traveling against the tumble is reduced so that they can be balanced one against another. This provides suitable mixture stratification as initially intended.

According to the eighth aspect of the invention, since the fuel injection timing is compensated to the retard side until the actual fuel injection pressure has reached the modified target value by compensation control on the fuel pressure, the influence of an energy drop of the tumble can be alleviated. Therefore, even if the delay in control over the fuel pressure is relatively large, a mixture can suitably be stratified to prevent transient deterioration in combustion quality and the like.

According to the ninth aspect of the invention, even if the energy of tumble is dropped due to a decrease in intake air density, the injection timing of a fuel to be injected against the tumble is retarded. This enables fuel spray to reach the vicinity of the spark plug electrode at a desired timing, thereby providing suitable mixture stratification as initially intended.

According to the tenth aspect of the invention, when the energy of tumble is raised due to a change in intake air temperature or atmospheric pressure, the effects as in the first aspect of the invention can fully be obtained like the second aspect of the invention.

According to the eleventh aspect of the invention, even if the energy of tumble is raised due to an increase in intake air density, the influence of this energy rise can be alleviated by reducing the tumble flow rate. This provides suitable mixture stratification as initially intended.

According to the twelfth aspect of the invention, even if the energy of tumble is raised due to an increase in intake air density, the energy of fuel spray traveling against the tumble is increased so that they can be balanced one against another. This provides suitable mixture stratification as initially intended.

According to the thirteenth aspect of the invention, since the fuel injection timing is compensated to the advance side until the actual fuel injection pressure has reached the modified target value by compensation control on the fuel pressure, the influence due to an energy rise of the tumble can be alleviated. Therefore, even if the delay in control over the fuel pressure is relatively large, the mixture can suitable be stratified to thereby prevent transient deterioration in combustion quality and the like.

According to the fourteenth aspect of the invention, even if the energy of tumble is raised due to an increase in intake air density, the injection timing of a fuel to be injected against the tumble is advanced. This enables fuel spray to reach the vicinity of the spark plug electrode at a desired timing thereby providing suitable mixture stratification.

According to the in-cylinder direct injection engine system of the fifteenth and/or sixteenth aspect of the invention, the same effects as in the first aspect can be obtained.

DESCRIPTION OF THE PREFERRED EMBODIMENT

Hereinafter, embodiments of the present invention will be described with reference to the drawings.

Generic Engine Structure

Figure 2:
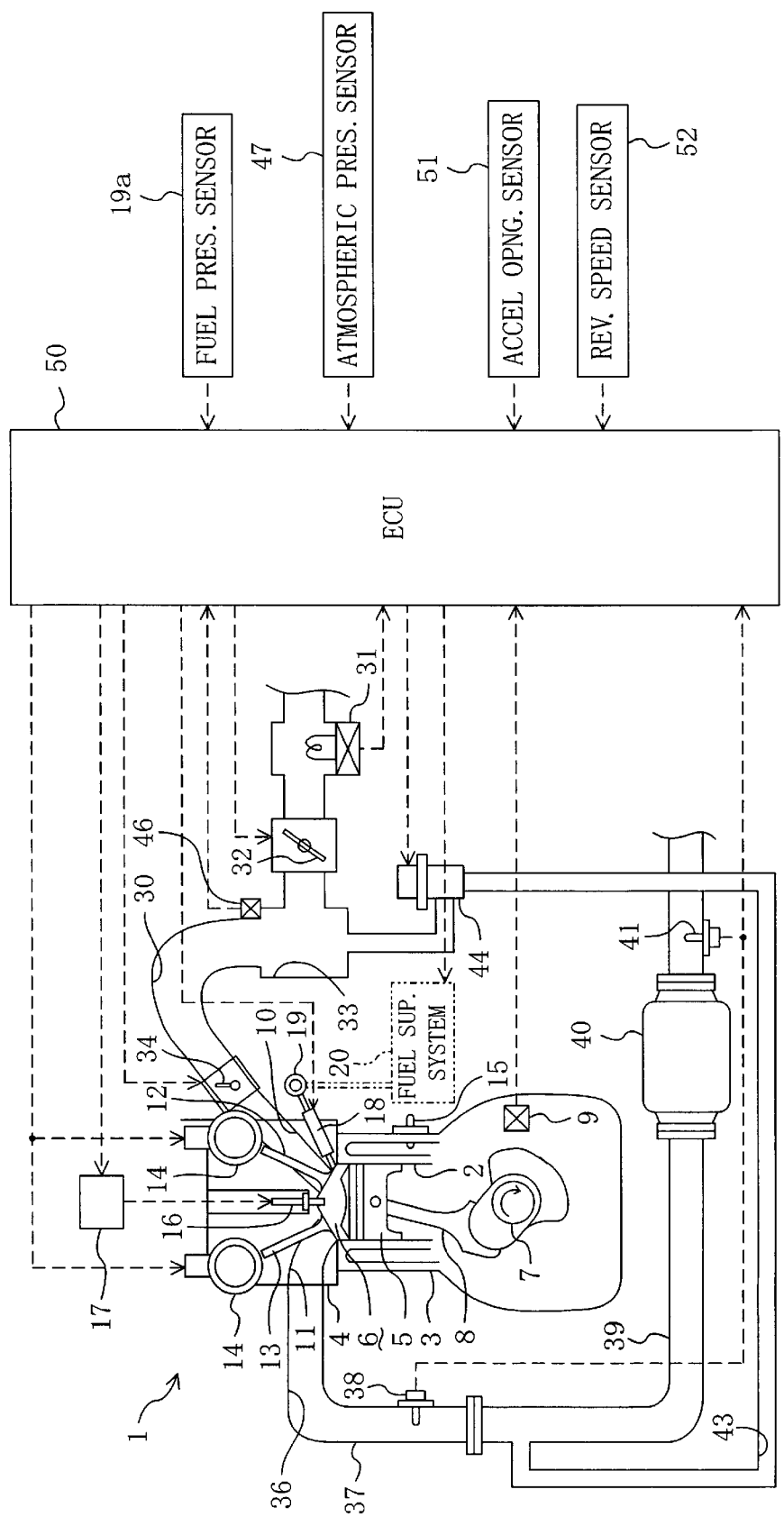
FIG. 2 is a diagram showing the generic structure of an engine according to the above embodiment.

FIG. 2 shows the generic structure of an in-cylinder direct injection engine 1 according to an embodiment of the present invention. This engine 1 includes a cylinder block 3 in which a plurality of cylinders 2, 2, . . . (only one shown in the figure) are arranged in line and a cylinder head 4 disposed on the cylinder block 3. A piston 5 is fitted into each of the cylinders 2 for vertical reciprocating motion in the figure. A combustion chamber 6 is defined between the piston 5 and the cylinder head 4 in the cylinder 2. A crank shaft 7 is rotatably supported below the piston 5 in the cylinder block 3, and the crank shaft 7 and the piston 5 are connected through a connecting rod 8. At one side of the crank shaft 7, a solenoid-actuated crank angle sensor 9 is disposed for detecting the revolving angle of the crank shaft 7. Further, in a sidewall of the cylinder block 3, a water temperature sensor 15 is disposed for detecting the temperature condition of a cooling water in a water jacket inside of the cylinder block 3 (engine water temperature).

Figure 3:
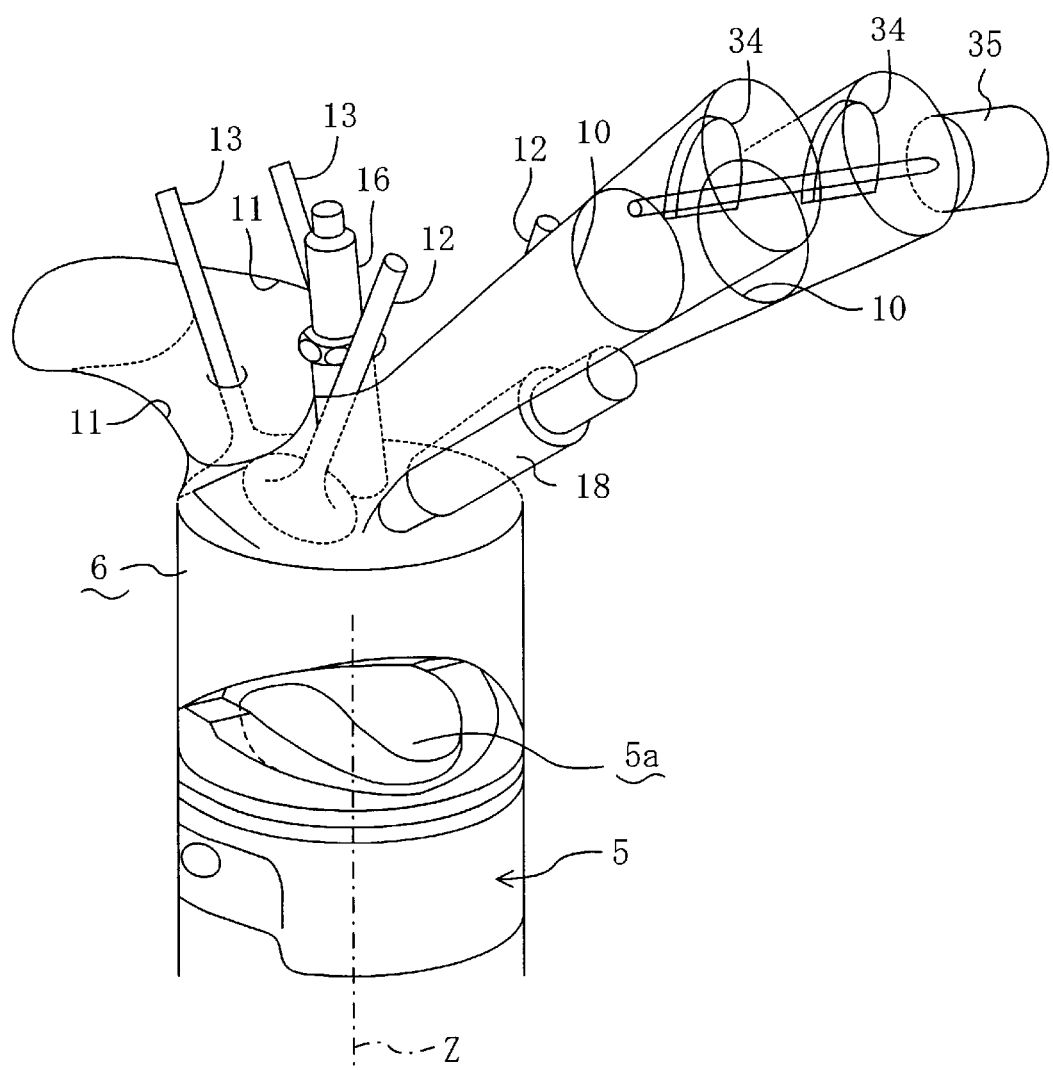
FIG. 3 is a perspective view showing the layout of a piston crown surface, an intake port, a spark plug and an injector.

As shown in FIG. 3 in enlarged dimension, the ceiling of each cylinder 2 is formed with two inclined surfaces extending substantially from its midportion to the vicinity of the lower end surface of the cylinder head 4, thereby forming a so-called "pent-roof type" combustion chamber 6 which takes on a roof-like form such that the inclined surfaces lean to each other. Two intake ports 10, 10 and two exhaust ports 11, 11 are formed in the two inclined surfaces, respectively. Intake valves 12, 12 and exhaust valves 13, 13 are disposed at the corresponding open ends of the ports. The two intake ports 10, 10 each extend straight and obliquely upward from the combustion chamber 6 and are open independently of each other on one side of the engine 1 (right-hand side in FIG. 2), while the two exhaust ports 11, 11 meet together halfway, then extend substantially horizontally and are finally open on the other side of the engine 1 (left-hand side in FIG. 2).

The intake valve 12 and the exhaust valve 13 are opened in a manner to be pressed in directions of their valve stems by two cam shafts (not shown) pivoted inside of the cylinder head 4. These cam shafts are rotated by respective timing belts in synchronism with the crank shaft 7, so that the intake valve 12 and the exhaust valve 13 can be opened and closed at respective predetermined timings for each cylinder 2. Known variable valve timing mechanisms 14, 14 each for continuously changing the phase relative to the crank shaft 7 within a predetermined range of angles are attached to the two cam shafts, respectively. The variable valve timing mechanisms 14, 14 individually changes the respective opening/closing timings of the intake valve 12 and the exhaust valve 13.

Further, as shown in FIG. 3, a spark plug 16 is disposed at an upper part of the combustion chamber 6 in each cylinder 2 so as to be surrounded by the four valves 12, 13. An electrode at the distal end of the spark plug 16 is located at a position that protrudes from the ceiling of the combustion chamber 6 by a predetermined distance. On the other hand, a firing circuit 17 (shown only in FIG. 2) is connected to the proximal end of the spark plug 16 to conduct electricity to the spark plug 16 at a predetermined ignition timing for each cylinder 2. The crown surface of the piston 5 forming the bottom of the combustion chamber 6 is provided at the midportion thereof with a lemon-shaped cavity 5a, and sidewalls of the cavity 5a have such an angular form as to correspond to the ceiling of the combustion chamber 6.

At the peripheral edge of the combustion chamber 6, an injector (fuel injection valve) 18 is disposed so as to be located below and sandwiched between the two intake ports 10, 10. This injector 18 is a known swirl injector for injecting a fuel as a swirl, through a nozzle hole located at its distal end, in the form of a hollow corn in a direction that the axis of the injector 18 extends. With this swirl injector 18, when the fuel injection pressure is increased, the penetration of fuel spray is also increased with the rise in the pressure. Generally, for the swirl injector, the penetration of fuel spray tends to become smaller as the spray cone angle is increased, while the penetration becomes larger as the spray cone angle is decreased.

Figure 4:
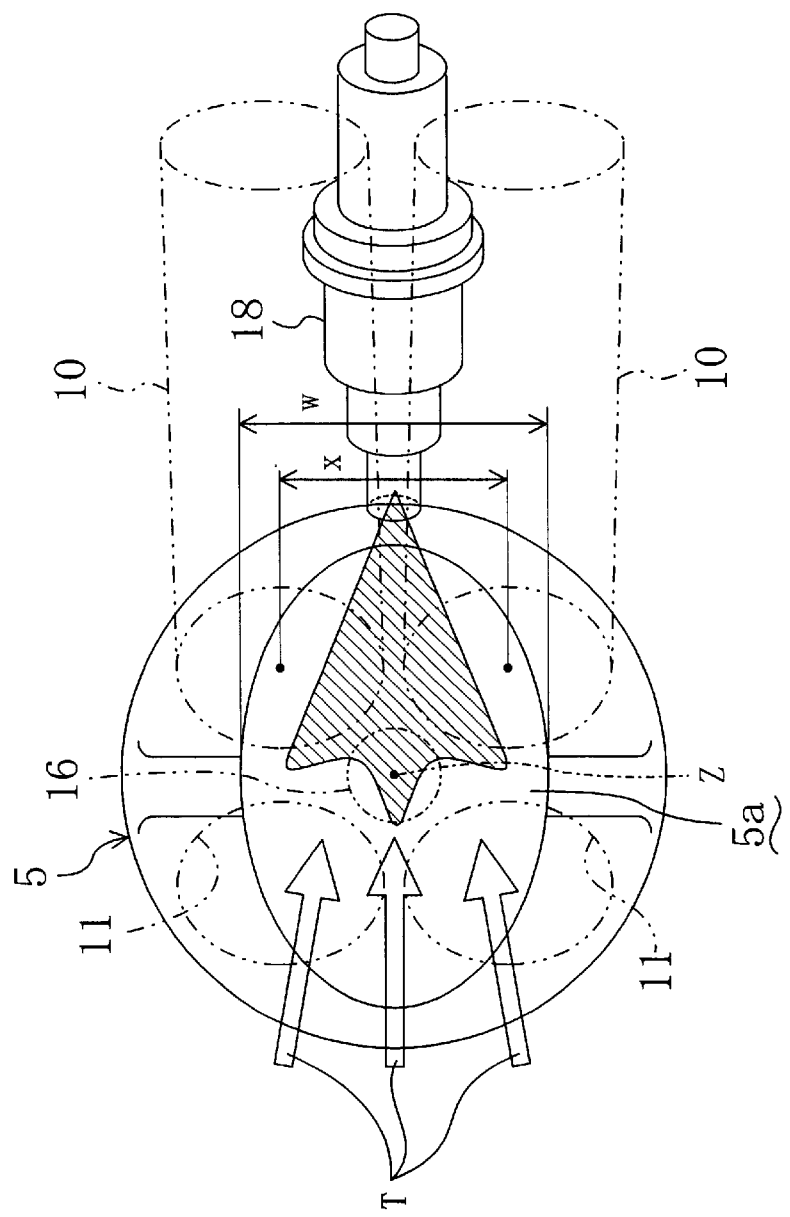
FIG. 4 is a diagram illustrating the positional relation among a cavity of the piston crown surface, a tumble and fuel spray when viewed along the center line of the cylinder.

Description will be made in further detail about the positional relation between the cavity 5a of the piston 5 crown surface and the injector 18. As shown in FIG. 4, the cavity 5a of the piston 5 crown surface is disposed so that its lengthwise direction substantially corresponds to a direction of fuel injection from the injector 18 (direction in which the center line of fuel spray extends) when viewed along the cylinder center line z. This allows a tumble T, which is generated in the combustion chamber 6 during the intake stroke of the cylinder 2 as described later, to smoothly flow along the form of the cavity 5a thereby improving the retention of the tumble T, and allows the tumble T to stably flow toward the injector 18 in a manner to envelop fuel spray.

Figure 5:
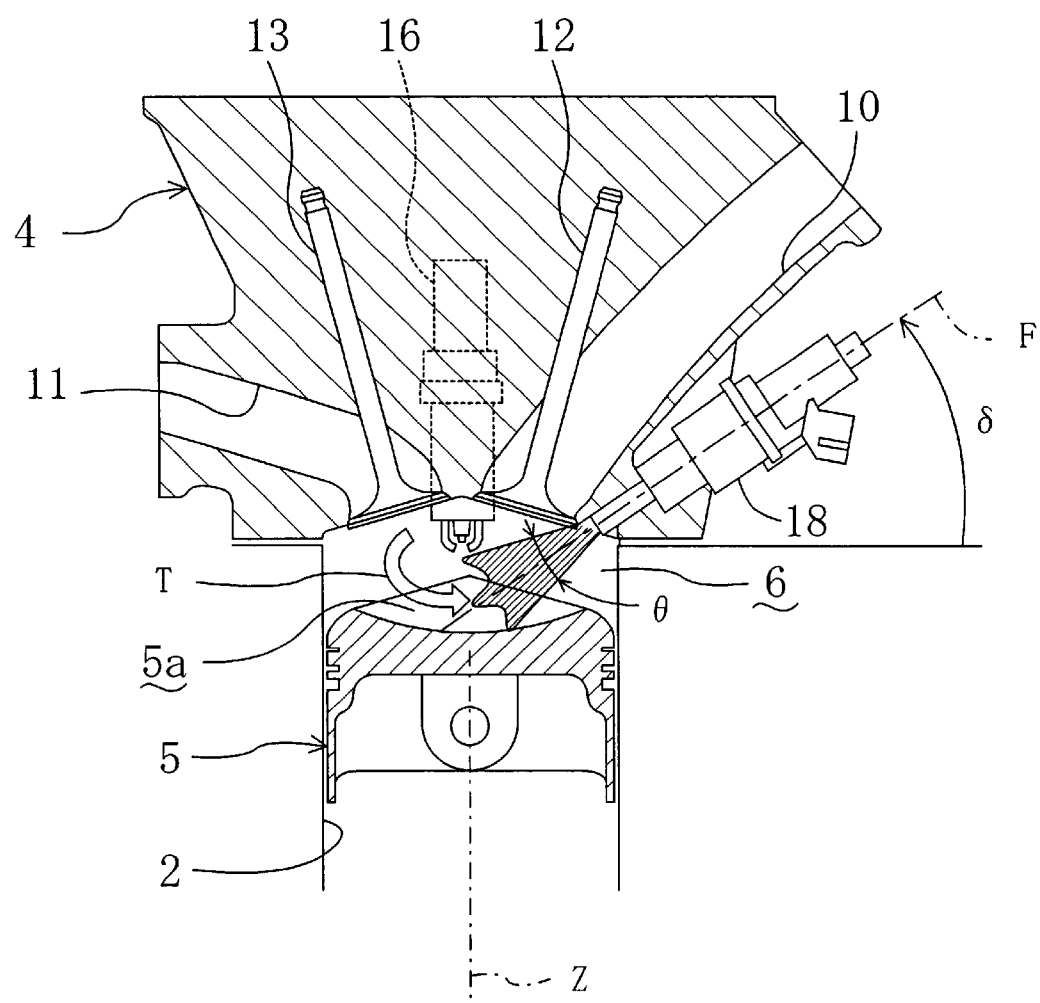
FIG. 5 is a view illustrating the center line and an exemplary spray cone angle of fuel spray from the injector.

Further, as shown in FIG. 5, the injector 18 is disposed so that its axis (corresponding to the center line F of fuel spray in this embodiment) makes a predetermined tilt angle $\delta$ (preferably, $\delta=25°$ to $50°$, approximately $30°$ in the figure) with respect to a horizontal cross section of the cylinder 2. Further, the spray cone angle $\theta$ of fuel spray from the injector 18 generally changes depending upon the pressure conditions of the combustion chamber 6. In this embodiment, however, the spray cone angle $\theta$ of fuel spray during the compression stroke of the cylinder 2 is set to fall within a predetermined range (for example, $\theta$=about $20°$ to about $60°$).

With the above-described layout of the injector 18, i.e., if the tilt angle $\delta$ of the spray center line F and the spray cone angle $\theta$ are set as described above, the engine 1 of this embodiment can cause fuel spray to impinge substantially oppositely against the tumble T flowing along the cavity 5a of the piston 5 crown surface at the fuel injection timing (see FIG. 11) so that behavior of the fuel spray can be controlled mainly by the tumble T thereby retaining a flammable mixture in moderate concentration condition in the middle of the combustion chamber 6, though details will be described later.

Figure 6:
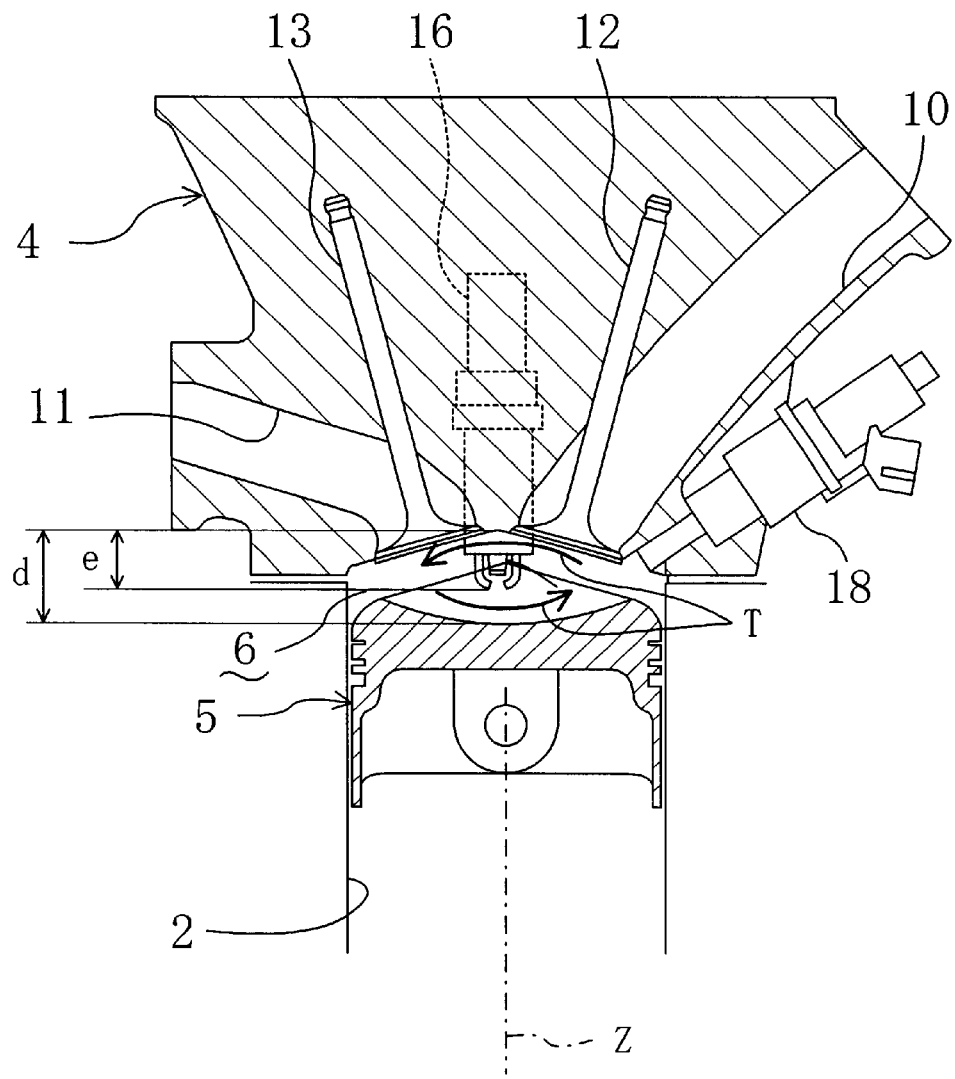
FIG. 6 is a view illustrating the positional relation between the spark plug electrode and the piston at an ignition timing for the cylinder.

Furthermore, as shown in FIGS. 5 and 6, the spark plug 16 electrode is placed to protrude by a predetermined amount from the combustion chamber 6 ceiling and along the cylinder center line z so as to be able to ignite the retained mixture with reliability. Specifically, it is assumed that at the ignition timing for the cylinder 2 (for example, at BTDC $30°$ CA), d is the distance on the cylinder center line z from the combustion chamber 6 ceiling to the deepest position of the cavity 5a of the piston 5. In this case, the distance e (amount of protrusion) on the cylinder center line z from the combustion chamber 6 ceiling to the spark plug 16 electrode is set at a value ranging from approximately $\frac{1}{3}$d to approximately $\frac{2}{3}$d. This means that the spark plug 16 electrode is located in the center of the tumble T vortex over a duration after the fuel injection timing and before the ignition timing for the cylinder 2, i.e., held in a condition that the mixture easily stays therearound.

Further, as shown in FIG. 5, in this embodiment where the fuel is injected by the injector 18 toward the piston 5 crown surface located at an obliquely downward position in the figure, it can be also said that the spark plug 16 electrode is located at a position lower than that of the injection nozzle of the injector 18 (i.e., closer to the piston 5 crown surface with respect to an extending direction of the cylinder center line z).

Figure 7A:
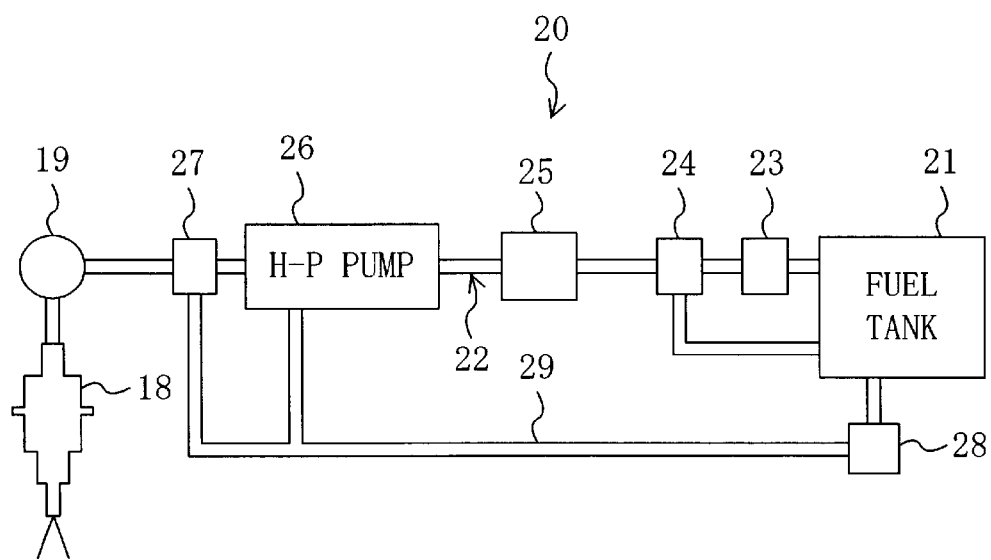
FIG. 7 shows schematic diagrams illustrating structures of fuel supply systems.

The injectors 18, 18, . . . disposed for each cylinder 2 as mentioned above are connected to a fuel distributing pipe 19 common to all the cylinders 2 , 2, . . . , and the fuel distributing pipe 19 is adapted to distribute a high-pressure fuel, having been supplied from a fuel supply system 20, to each cylinder 2. More specifically, the fuel supply system 20 of this engine is configured as for example shown in FIG. 7A, wherein a low-pressure fuel pump 23, a low-pressure regulator 24, a fuel filter 25, a high-pressure fuel pump 26 and a high-pressure regulator 27 are arranged in this order from upstream to downstream of a fuel passage 22 communicating between the fuel distributing pipe 19 and a fuel tank 21. The high-pressure fuel pump 26 and the high-pressure regulator 27 are connected individually to the fuel tank 21 through a return passage 29. The return passage 29 is provided with a low-pressure regulator 28 for regulating the pressure conditions of the fuel returned toward the fuel tank 21. Also, the fuel distributing pipe 19 is provided with a fuel pressure sensor 19a for detecting the pressure condition of the fuel inside of the pipe (fuel pressure).

In the fuel supply system 20, the fuel, having been pumped up from the fuel tank 21 by the low-pressure fuel pump 23, is pressure-regulated by the low-pressure regulator 24, filtered by the fuel filter 25, and then fed to the high-pressure fuel pump 26. The fuel is further raised in pressure by the high-pressure fuel pump 26 and part thereof is regulated in flow rate and supplied to the fuel distributing pipe 19. The surplus fuel is returned to the fuel tank 21 through the return passage 29. During the time, the high-pressure regulator 27 is actuated on receipt of a signal from the below-mentioned ECU 50 to regulate the flow rate of the fuel so that the detected value of the fuel pressure sensor 19a falls within a proper range (for example, substantially 3 MPa to 13 MPa, preferably 4 MPa to 7 MPa during the stratified-charge combustion operation).

Figure 7B:
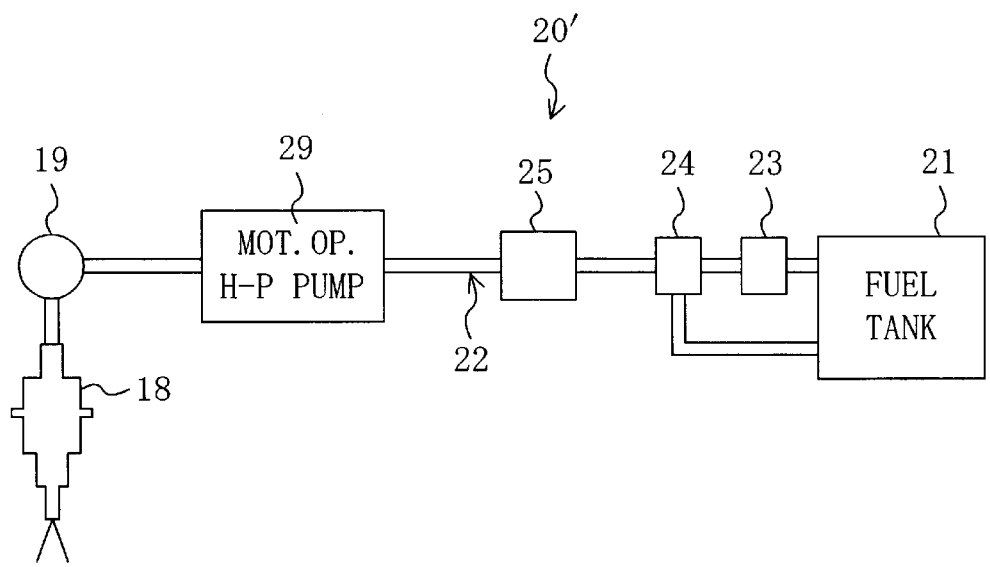

In this case, in the fuel supply system 20, the high-pressure fuel pump 26 and the high-pressure regulator 28 constitutes a fuel pressure regulating means for regulating the fuel injection pressure of the injector 18. It should be noted that the configuration of the fuel supply system 20 is not limited to the above and the high-pressure regulator 27 can be omitted from the system, as for example in the case of a fuel supply system 20' shown in FIG. 7B. In such a case, the pressure conditions of a fuel can be controlled, with the use of a motor-operated high-pressure pump 29 which has an ability to change the discharge amount of the fuel over a wide range, by variably regulating the discharge amount of the fuel flowing from the motor-operated high-pressure pump 29 toward the fuel distributing pipe 19.

As shown in FIG. 2, an intake passage 30 which communicates with the intake ports 10, 10 of each cylinder 2 is connected to one side surface of the engine 1. This intake passage 30 provides for supplying an intake air, having been filtered through an unshown air cleaner, to the combustion chamber 6 of the engine 1, wherein an airflow sensor 31 for detecting the amount of an intake air taken into the engine 1, an electric throttle valve 32 for throttling the intake passage 30, and a surge tank 33 are disposed in this order from upstream to downstream of the intake passage 30. The electric throttle valve 32 is not mechanically connected to an unshown accel pedal and is driven into opening and closing motion to a desired opening by an unshown electric drive motor.

The intake passage 30 located downstream from the surge tank 33 is formed into independent passages branched for each cylinder 2, and a downstream end of each independent passage is further branched into two passages communicating with the respective intake ports 10, 10. On the upstream sides of both of the two intake ports 10, 10, as also shown in FIG. 3, tumble swirl control valves (TSCV) 34, 34 as intake airflow control means are provided for controlling the flow rate of a tumble T in the combustion chamber 6, and are actuated into opening and closing positions by, for example, a stepping motor 35 (shown only in FIG. 3). Each of the TSCVs 34, 34 is formed by partly cutting away a circular butterfly valve, in this embodiment, by cutting away a portion located below from a valve stem 34a. When the TSCV 34 is closed, an intake air flows downstream from only the cut-away portion to generate an intense tumble T in the combustion chamber 6. On the other hand, as the TSCV 34 is opened, the intake air also flows through portions other than the cut-away portion so that the tumble T intensity is gradually weakened.

A tumble generating means for generating a tumble T in the combustion chamber 6 is constituted by the intake ports 11, 11. The tumble generating means can generate a tumble T flowing between the electrode of the spark plug 16 and the crown surface of the piston 5 toward the injector 18 during the compression stroke of the cylinder 2. Further, a variable tumble means which can change the flow rate of a tumble is constituted by the TSCV 34 and the stepping motor 35. It should be noted that the forms of the intake ports 10 and the TSCVs 34 are not limited to those as described above. For example, the intake ports may be a so-called common port in which its flow passages are combined together on the upstream side. In this case, the form of the TSCV may be based on a butterfly valve having the form corresponding to a cross section of the common port and may be obtained by partly cutting away the butterfly valve like the first-mentioned TSCV.

An exhaust passage 36 for exhausting a burnt gas (exhaust gas) from the combustion-chamber 6 is connected to the other side surface of the engine 1 in FIG. 2. The upstream end of the exhaust passage 36 constitutes an exhaust manifold 37 which is branched for each cylinder 2 and communicates with the exhaust port 11. A linear $O_2$ sensor 38 for detecting the oxygen concentration in an exhaust gas is disposed at a collecting pipe part of the exhaust manifold 37. The linear $O_2$ sensor 38 is used for detecting the air fuel ratio based on the oxygen concentration in the exhaust gas. With this sensor, a power output linear to an oxygen concentration can be obtained within a predetermined range of air fuel ratios including the theoretical air fuel ratio.

The upstream end of an exhaust pipe 39 is connected to the confluent portion of the exhaust manifold 37, while the downstream end thereof is connected to a catalyst 40 for purifying the exhaust gas. The catalyst 40 is a NOx absorption-reduction type one for absorbing NOx in an atmosphere of an exhaust gas of high oxygen concentration while emitting absorbed NOx with decrease in oxygen concentration and reductively purifying the exhaust gas, and exhibits high exhaust gas purification performance like so-called 3-way catalytic converter particularly in the vicinity of the theoretical air fuel ratio. Further, in order to determine the deteriorating condition of the catalyst 40, a known lambda $O_2$ sensor 41 which inverts its output stepwise from the border line on the theoretical air fuel ratio is provided on the downstream side of the catalyst 40. It should be noted that 3-way catalytic converter may be additionally disposed in line with the NOx absorption-reduction type catalyst 40.

Furthermore, an upstream end of an EGR passage 43 for recirculating part of the exhaust gas flowing through the exhaust passage 36 to the intake passage 30 is connected to an upstream portion of the exhaust pipe 39. A downstream end of the EGR passage 43 is connected to the surge tank 33. In the vicinity of the downstream end of the EGR passage 43, an electric EGR valve 44 capable of opening control is disposed for controlling the amount of recirculation of the exhaust gas through the EGR passage 43. Further, the surge tank 33 is provided with an intake air temperature sensor 46 for detecting temperature conditions of the intake air downstream from a connecting point with the downstream end of the EGR passage 43. It is to be noted that the downstream end of the EGR passage 43 may be connected to the intake air passage 30 between the throttle valve 32 and the surge tank 33. In this case, the intake air temperature sensor 46 should be disposed at a portion of the intake air passage 30 downstream of its connecting point with the downstream end of the EGR passage 43.

Control on Engine Combustion Mode

The variable valve timing mechanism 14, the firing circuit 17 of the spark plug 16, the injector 18, the high-pressure regulator 27 of the fuel supply system 20, the electric throttle valve 32, the TSCVs 34, the electric EGR valve 44 and the like are controlled in their operations by an engine control unit 50 as a control means (hereinafter, referred to as an ECU). On the other hand, the ECU 50 receives output signals from at least the crank angle sensor 9, the water temperature sensor 15, the fuel pressure sensor 19a and the airflow sensor 31, and also receives output signals from an accel opening sensor 51 for detecting the accel stroke Acc, i.e., the stepping-on measurement of an unshown accel pedal, and output signals from a revolving speed sensor 52 for detecting the revolving speed of the engine 1 (revolving speed of the crank shaft 7).

The ECU 50 controls, based on the signal input from each sensor, the valve timings of the intake and exhaust valves 12, 13, the ignition timing of the spark plug 16 for each cylinder 2, the fuel injection quantity, the injection timing and injection pressure of the injector 18, the amount of intake air regulated by the throttle valve 32, the tumble intensity regulated by the TSCVs 34, the rate of exhaust gas recirculation regulated by the EGR valve 44 and the like in accordance with operating conditions of the engine 1. Thus, in the warm conditions, the engine 1 is operated to switch between stratified-charge combustion and homogeneous combustion modes.

Figure 8:
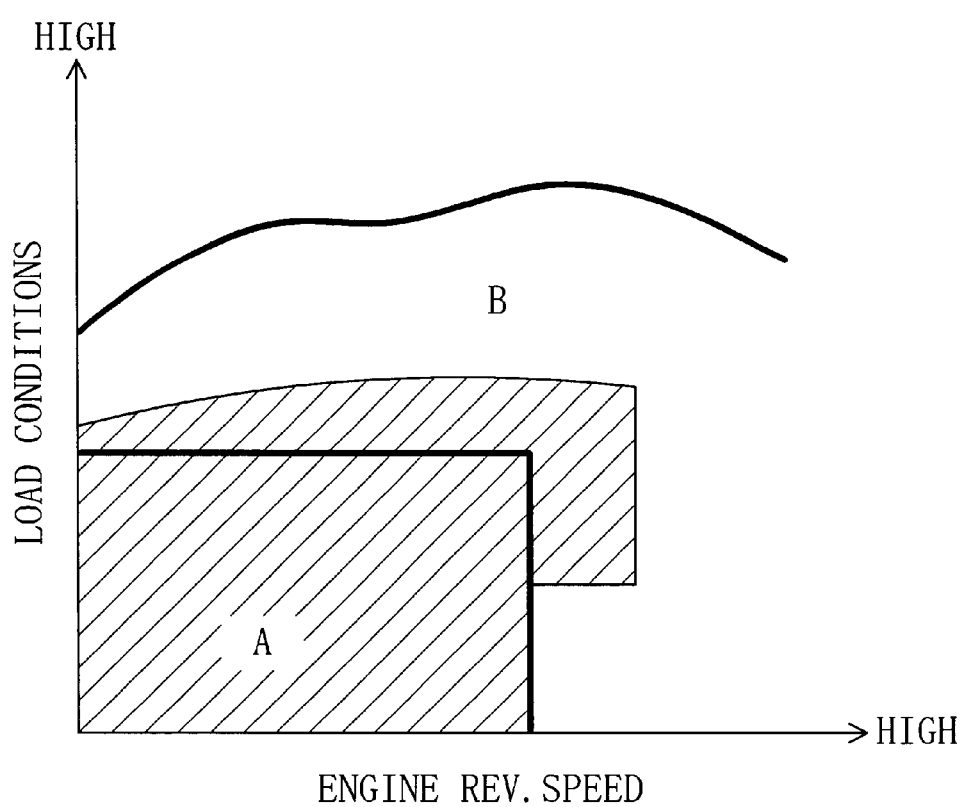
FIG. 8 is an exemplary control map in which respective operation zones where the engine is put into stratified-charge combustion and homogeneous-charge combustion modes are set.
Figure 9:
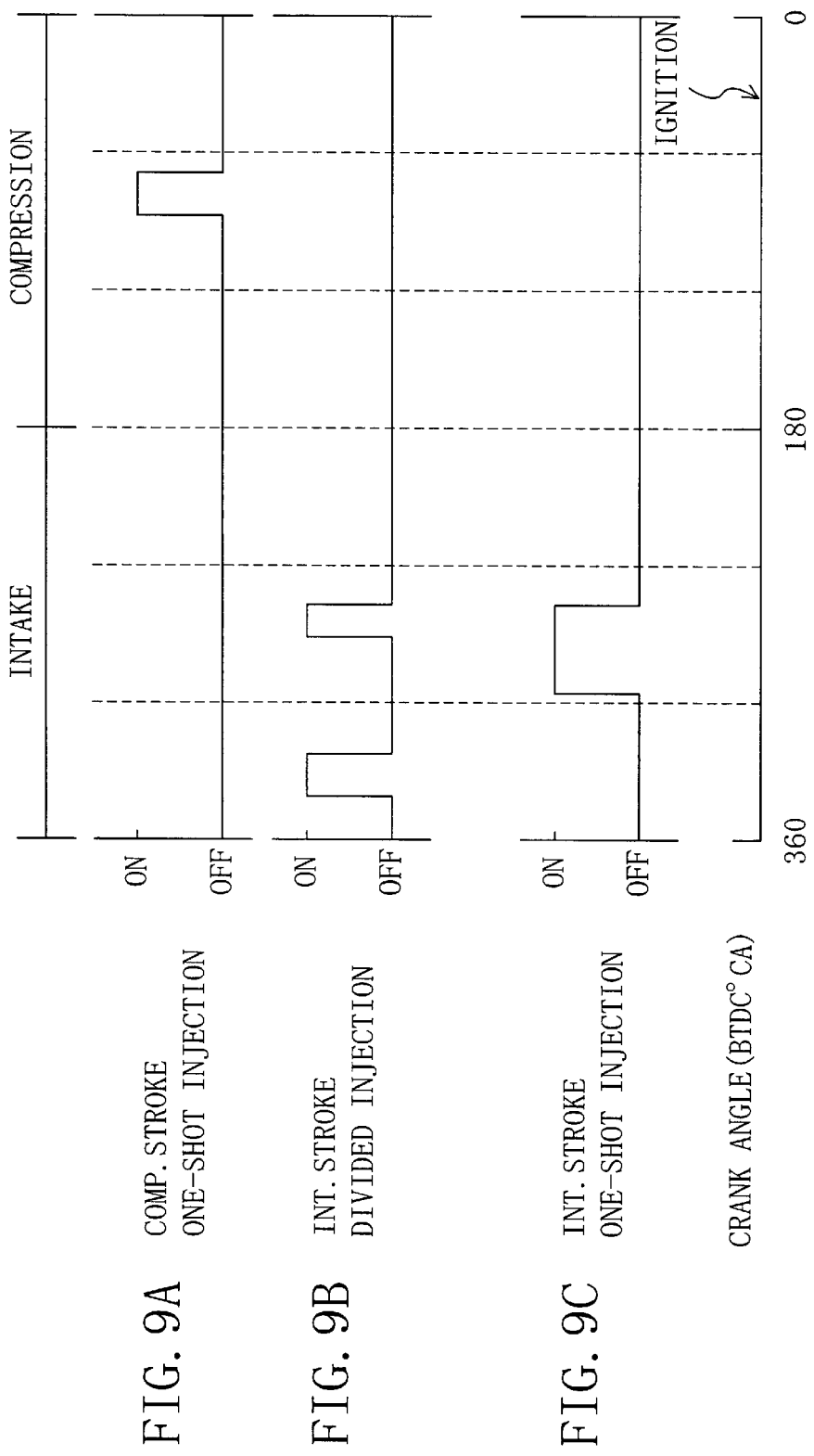
FIG. 9 is a time chart schematically showing the fuel injection timing of the injector.

More specifically, as shown as an example in FIG. 8, in the warm conditions of the engine 1, a preset operation zone A on the low-load and low-speed end is a stratified-charge combustion zone. In this zone, as schematically shown in FIG. 9A, the engine 1 falls into the stratified-charge combustion mode, in which a mixture is combusted with existing in a stratified form in the vicinity of the spark plug 6, by collectively injecting a fuel from the injector 18 during a predetermined period at the compression stroke of the cylinder 2 (for example, the range from 40° to 140° before the top dead center (BTDC) at the compression stroke). In this zone, the throttle valve 32 is set at a relatively large opening in order to reduce intake loss of the engine 1. At this time, an average air fuel ratio of the combustion chamber 6 is much leaner (for example, A/F>30) than the theoretical air fuel ratio (A/F≈14.7).

On the other hand, the zone different than the stratified-charge combustion zone A is a so-called homogeneous combustion zone B. In this zone, as schematically shown in FIGS. 9B and 9C, the engine 1 falls into a combustion mode in which a fuel is injected by the injector 18 during the intake stroke of the cylinder 2 so as to be sufficiently mixed with an intake air and a homogeneous mixture thus formed in the combustion chamber 6 is combusted. In this homogeneous combustion mode, under its almost all operating conditions, the fuel injection quantity, the throttle opening and the like are controlled so that the air fuel ratio of the mixture is substantially equal to the theoretical air fuel ratio. Particularly under near full load operating conditions, the air fuel ratio is controlled to be richer (for example, approximately A/F=13) than the theoretical air fuel ratio thereby obtaining a large power output corresponding to high load.

Further, in a region shown in oblique lines in the figure in the warm conditions of the engine 1, the EGR valve 44 is opened to recirculating part of the exhaust gas to the intake passage 30 through the EGR passage 43. At this time, the opening of the EGR valve 44 is controlled in accordance with the load conditions and revolving speeds of the engine 1 at least so that the rate of exhaust gas recirculation (hereinafter, also referred to as the EGR rate) is smaller at higher load. In this manner, production of NOx can be suppressed by the recirculated exhaust gas without impairing combustion stability of the engine 1.

For example, the rate of amount of exhaust gas recirculated to the intake passage 30 through the EGR passage 43 relative to the amount of fresh air may be used as the EGR rate. As employed herein, the fresh air refers to the outside air calculated by excluding the recirculated exhaust gas, the fuel gas and the like from the air taken in the cylinder 2. Further, in the cold conditions of the engine 1, to give top priority to ensuring combustion stability, the engine 1 is operated in the homogeneous combustion mode over the entire range of operating conditions and the EGR valve 44 is held fully closed.

Figure 10:
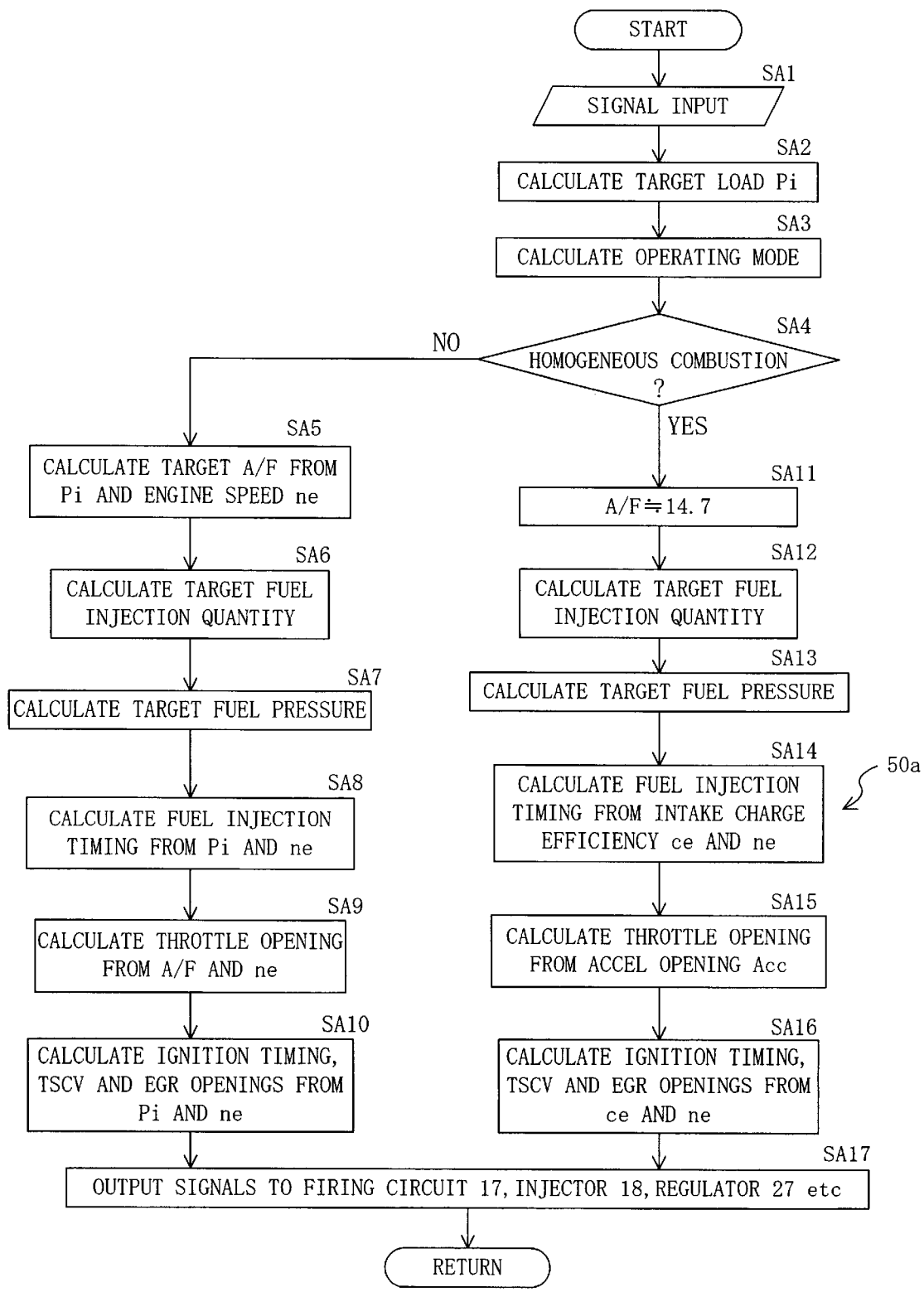
FIG. 10 is a flow chart showing a basic control procedure for the engine.

The control procedure of the ECU 50 for the injector 18 and the like is substantially as shown in a flow chart of FIG. 10. As shown in the figure, when the program starts, the ECU 50 inputs output signals from the crank angle sensor 9, the water temperature sensor 15, the airflow sensor 31, the accel opening sensor 51, the revolving speed sensor 52 and the like in Step SA1. Subsequently, in Step SA2, the target load Pi for the engine 1 is calculated based on the engine revolving speed ne detected by the revolving speed sensor 52 and the accel opening Acc detected by the accel opening sensor 51. To determine the target load Pi, optimal values corresponding to respective accel openings Acc and engine revolving speeds ne are previously calculated and recorded as a map, the map is electronically stored in a memory of the ECU 50, and the value of the target load Pi corresponding to the current accel opening Acc and current engine revolving speed ne is read out of the map.

Then, in Step SA3, the operating mode of the engine 1 is read out of the control map as shown in FIG. 8 based on the calculated target load Pi and the engine revolving speed ne and set (Calculate Operating Mode). In the subsequent steps from Step SA4 to Step SA17, control parameters are calculated individually in a manner that the calculation made separately between the cases of the stratified-charge combustion mode and the homogeneous combustion mode, and the injector 18, the throttle vale 32 and the like are actuated based on the calculation results. Specifically, if the determination in Step SA4 is NO indicating that the engine 1 is not in the homogeneous combustion mode, then the engine 1 is in the stratified-charge combustion mode and therefore the program proceeds with Step SA5. In this step, the target air fuel ratio A/F of the engine 1 is calculated based on the target load Pi and the engine revolving speed ne. Also for the target air fuel ratio A/F, its optimal values corresponding to target loads Pi and engine revolving speeds ne are previously experimentally determined and recorded as a map in the memory of the ECU 50. Therefore, the target air fuel ratio corresponding to the current target load Pi and current engine revolving speed ne is read out of the map.

Then, in Step SA6, a target fuel injection quantity is calculated based on the calculated target air fuel ratio A/F and an intake charge efficiency ce, and a valve open time (pulse width) of the injector 18 is also calculated based on the target fuel injection quantity and a fuel pressure detected by the fuel pressure sensor 19a. It should be noted that the intake charge efficiency ce is calculated based on an output of the airflow sensor 21 and the engine revolving speed ne.

Subsequently, in Step SA7, a target fuel pressure is calculated based on the engine revolving speed ne. This target fuel pressure is a reference fuel injection pressure corresponding to the current operating conditions of the engine 1. In this embodiment, its optimal values corresponding to respective engine revolving speeds ne are previously experimentally determined and recorded as a table, and the table is stored in the memory of the ECU 50. Therefore, the value of the target fuel pressure corresponding to the current engine revolving speed ne is read out of the table.

Then, in Step SA8, a valve open start timing of the injector 18, i.e., a fuel injection timing, is calculated based on the target load Pi and the engine revolving speed ne. The fuel injection timing is a reference value corresponding to the current operating conditions of the engine 1. Its optimal values corresponding to respective target loads Pi and engine revolving speeds ne are previously experimentally determined and recorded as a map in a memory of the ECU 50. Therefore, the value of the fuel injection timing corresponding to the current target load Pi and current engine revolving speed ne is read out of the map. It should be noted that the reference fuel injection timing is set in association with the ignition timing of each cylinder 2 so that a mixture is suitably stratified around the spark plug 16 at the ignition timing of each cylinder 2, though it is more fully described later.

Next, in Step SA9, a target opening of the throttle valve 32 is calculated based on the target air fuel ratio A/F and the engine revolving speed ne. Also for this throttle opening, its optimal values are previously experimentally determined and recorded as a map, and the target opening value corresponding to the current target air fuel ratio A/F and current engine revolving speed ne is read out of the map. In this case, the correspondence between the throttle opening and both of the target air fuel ratio A/F and the engine revolving speed ne varies depending upon the existence or absence of recirculated exhaust gas. Therefore, separate maps are prepared for the cases of recirculating or not recirculating an exhaust gas, and the target throttle opening is read out of either map.

Then, in Step SA10, control parameters for the spark plug 16, the TSCV 34 and the EGR valve 44 are determined. Specifically, the ignition timing and the target openings of the TSCV 34 and the EGR valve 44 are each calculated based on the target load Pi and the engine revolving speed ne. Also for each of these parameters, optimal values corresponding to respective target loads Pi and revolving speeds ne of the engine 1 are previously experimentally obtained and recorded as a map, and each parameter is calculated by reading the value corresponding to the current target load Pi and current engine revolving speed ne from the map.

On the other hand, if the determination in Step SA4 is YES indicating that the engine 1 is in the homogeneous combustion mode, the program proceeds with Step SA11 in which the target air fuel ratio is set at a predetermined value.

This value is A/F=14.7 under almost all engine operating conditions, but A/F=13 under near full load operating conditions. Subsequently, in Step SA12, the target fuel injection quantity is calculated as in Step SA6 and the valve open time of the injector 18 (pulse width) is determined based on the calculated target fuel injection quantity.

Then, in Step SA13, the target fuel pressure is calculated based on the engine revolving speed ne as in Step SA7. Subsequently, in Step SA14, the valve open start timing of the injector 18, i.e., the fuel injection timing, is calculated based on the intake charge efficiency ce and the engine revolving speed ne. Next, the target opening of the throttle valve 32 is calculated based on the accel opening acc in Step SA15, and the ignition timing and the target openings of the intake airflow control valve 34 and EGR valve 44 are calculated based on the intake charge efficiency ce and the engine revolving speed ne in Step SA16.

Next to Step SA10 or Step SA16, the program proceeds with Step SA17 in which signals as actuating instructions are output to the firing circuit 17, the injector 18, the high-pressure regulator 27 of the fuel supply system 20, the drive motor for the throttle valve 32, actuators for the TSCV 34 and the EGR valve 44, and then the program returns.

In the above control flow, the control parameters for the injector 18 are first calculated and the control parameters for the throttle valve 32, the firing circuit 17 and the like are then calculated. However, the order of calculations for these parameters is not limited to the above. Alternatively, calculations for those parameters may be made in parallel.

Fuel Injection Pressure Control During Stratified-charge Combustion Operation

For the engine 1 of this embodiment, in the above-mentioned stratified-charge combustion mode of the engine 1, suitable mixture stratification is provided by controlling behavior of fuel spray having been injected from the injector 18 during the compression stroke for each cylinder 2, by a tumble T in the combustion chamber 6.

Figure 11:
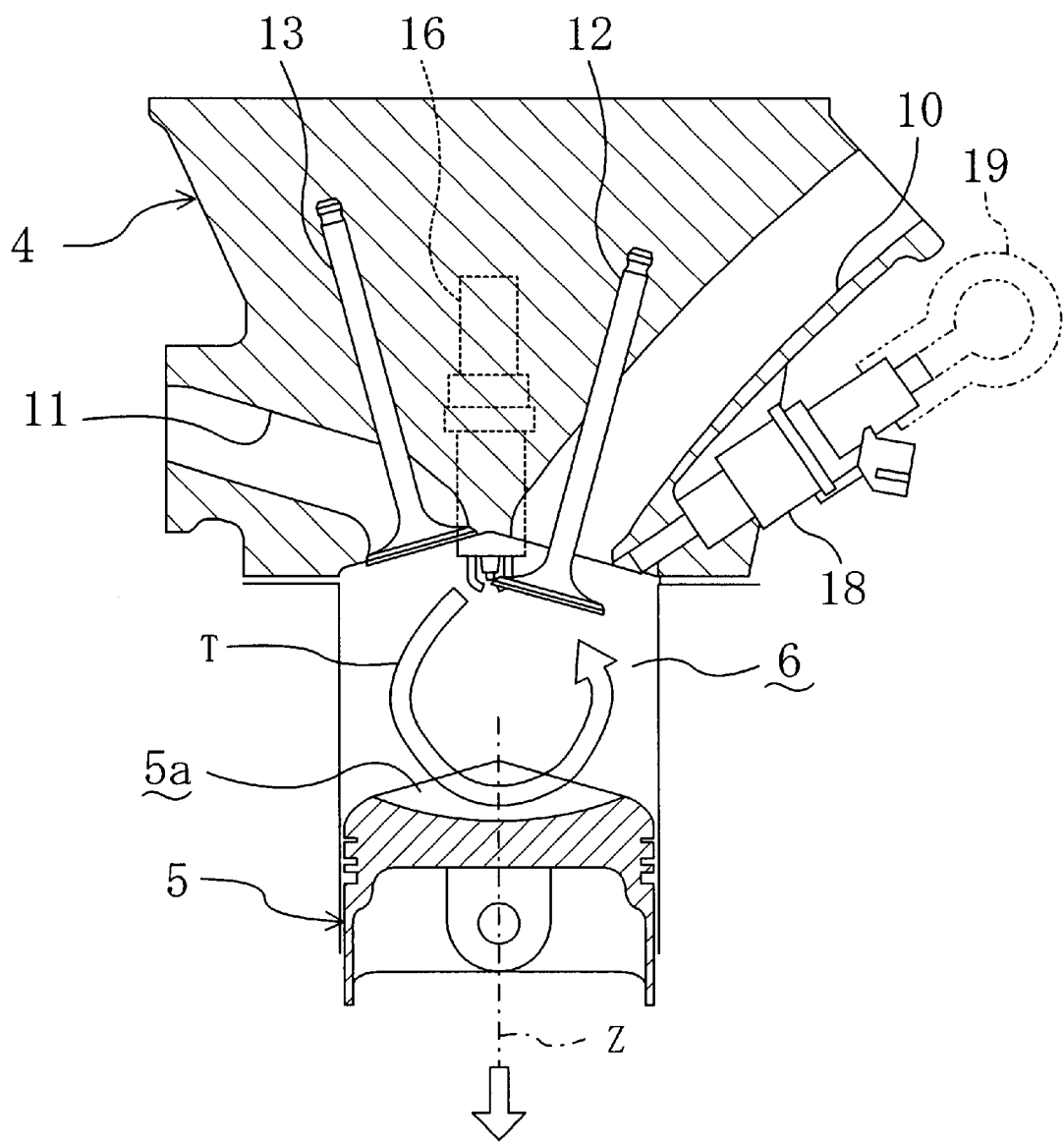
FIG. 11 is a view showing how the tumble is generated in the combustion chamber at an intake stroke of the cylinder.
Figure 12:
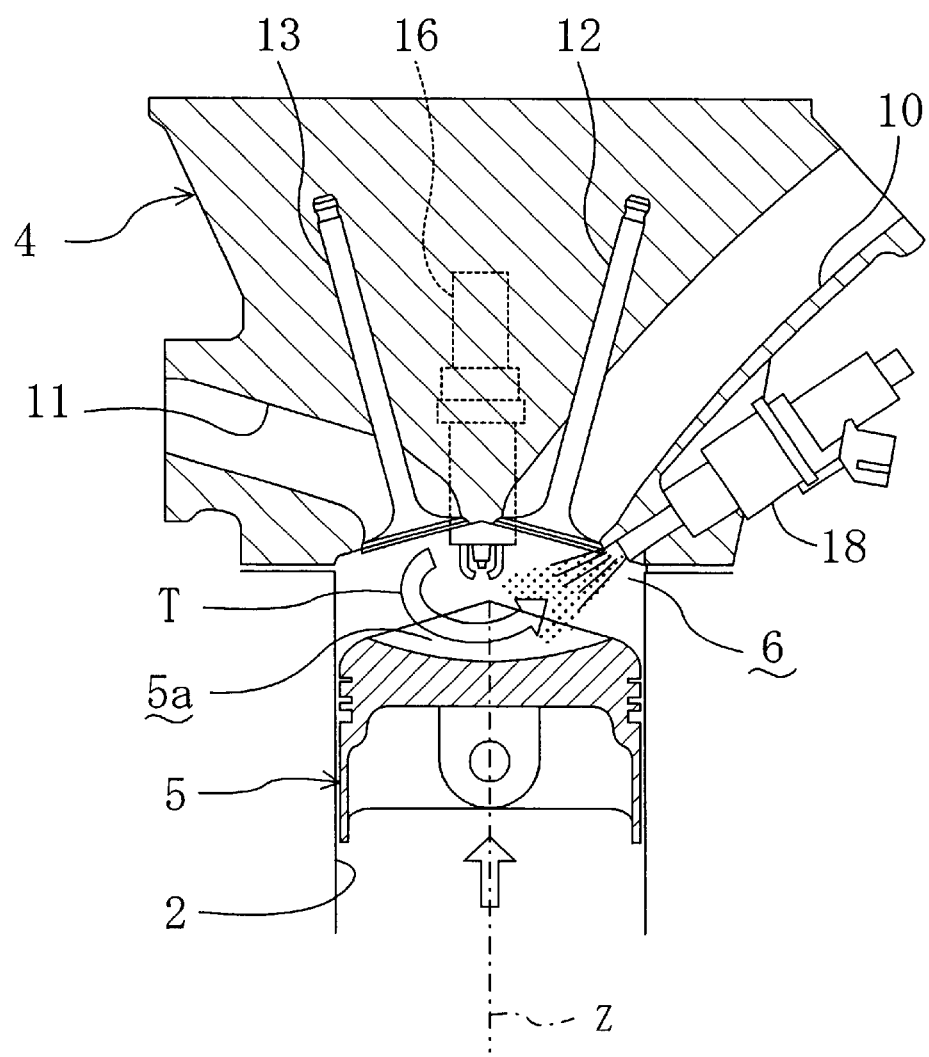
FIG. 12 is a view showing a state of fuel spray injected to impinge against the tumble at the fuel injection timing for the cylinder.

This point will be described below in detail. First, at the intake stroke of each cylinder 2, a tumble T is generated by an intake air flowing into the combustion chamber 6 through the intake ports 10, 10 as shown in FIG. 11. As shown in FIG. 12, this tumble T is retained up to the late stage of the compression stroke of the cylinder 2 and flows along the cavity 5a of the piston 5 crown surface toward the injector 18. In this state, when a fuel is injected by the injector 18 to impinge substantially oppositely against the tumble T with a suitable penetration, the fuel spray travels toward the spark plug 16 while being gradually reduced in speed by the tumble T. During the time, fuel droplets are carbureted and mixed with the air so that a flammable mixture is formed and retained in the vicinity of the spark plug 16 electrode at the ignition timing for the cylinder 2 as shown in oblique lines in FIG. 13.

Figure 14:
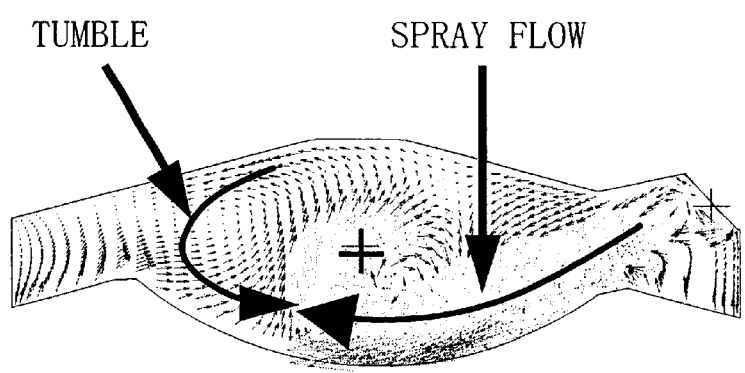
FIG. 14 is a view showing the result of a CFD analysis of flow distribution where the tumble and the fuel spray are substantially balanced one against another in a combustion chamber.
Figure 15A:
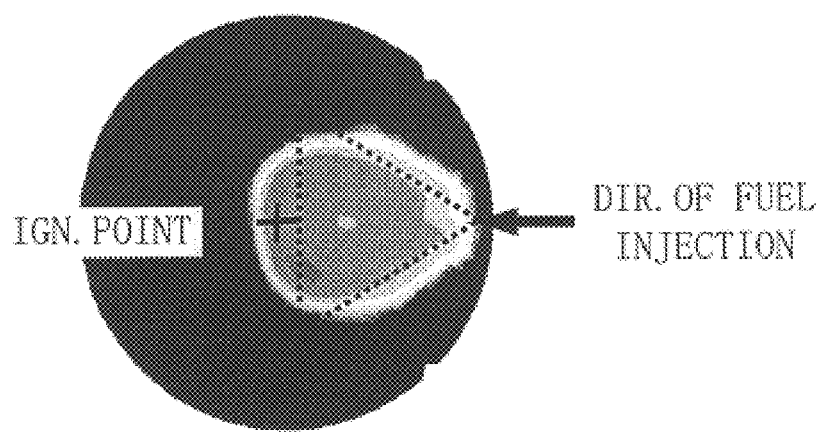
FIG. 15 shows states of a mixture formed in the vicinity of the spark plug electrode.
Figure 15B:
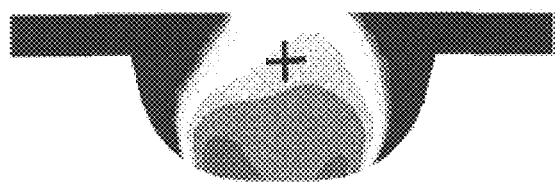

The flow distribution of the combustion chamber 6 near to the ignition timing for the cylinder 2 will be as for example shown in FIG. 14. This figure shows the result of analysis of the flow distribution of the combustion chamber 6 through the application of CFD (computational fluid dynamics). As shown in bold arrows in the figure, the spray flow, which is traveling from the right-hand side toward the middle of the combustion chamber, pushes away the tumble and reaches the vicinity of the spark plug electrode represented in + mark. Then, as for example shown in FIG. 15, a flammable mixture mass of suitable concentration will be retained around the spark plug 16 electrode (ignition point) near to the ignition timing for the cylinder 2. Accordingly, for this engine 1, penetration of fuel spray from the injector 18 is controlled in accordance with the flow rate of the oppositely flowing tumble, and a fuel is injected at a predetermined timing inversely calculated from the ignition timing of the cylinder 2. In this manner, a mixture can be suitably and stably stratified around the spark plug 16 electrode.

In this regard, since the flow rate of the tumble in the combustion chamber generally changes with the engine revolving speed, if the mixture will be suitably stratified using a tumble in the above-described manner, penetration of fuel spray from the injector should be controlled in accordance with the change in the tumble flow rate. Specifically, as shown in solid and imaginary lines in FIG. 16A, when the engine 1 is in the stratified-charge combustion zone A and its revolving speed ne is equal to or smaller than a set value ne* (for example, 3500 rpm), the flow rate of the tumble becomes higher as the engine revolving speed ne increases. For this reason, in this embodiment, the fuel injection pressure of the injector 18 is changed in accordance with the change in the tumble flow rate as described above, thereby changing fuel spray penetration as shown in FIG. 16B. That is, when the engine revolving speed ne is equal to or smaller than the set value ne*, fuel spray penetration is enhanced in accordance with the rise in the revolving speed ne.

Figure 16B:
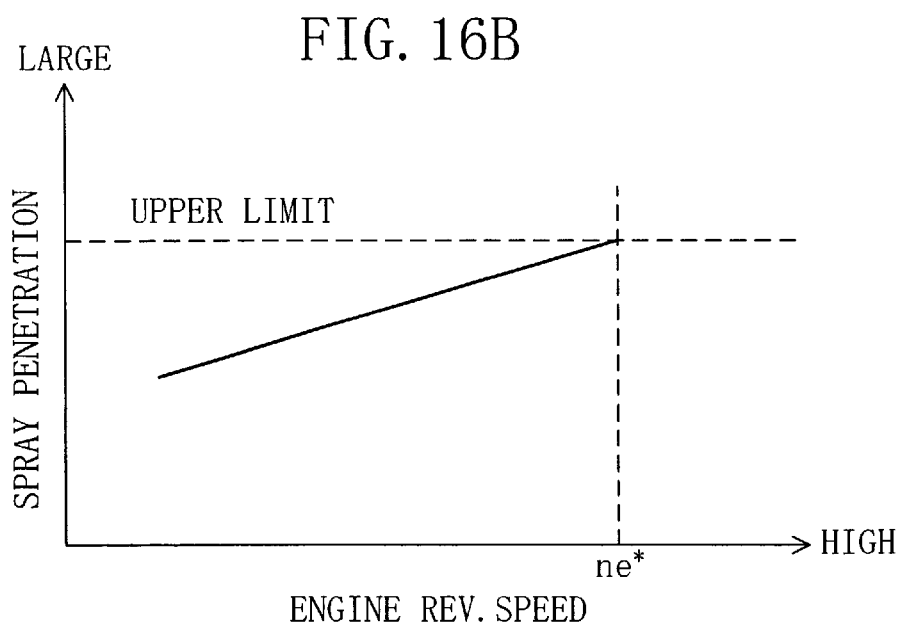
Figure 17:
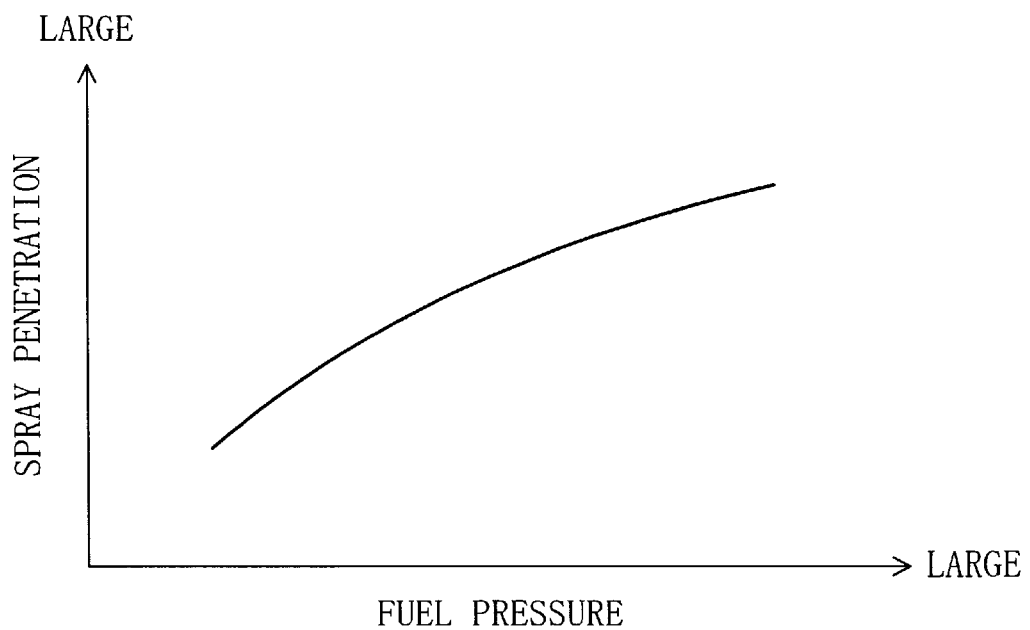
FIG. 17 is a map showing the relation between the fuel spay penetration and the fuel injection pressure.

Such control on fuel spray penetration is based on that the pressure of fuel to be supplied to the injector 18 for each cylinder 2 (fuel pressure) is changed by operation control of the ECU 50 over the high-pressure regulator 27 of the fuel supply system 20. A relationship as shown in FIG. 17 is established between the fuel pressure and the fuel spray penetration. Therefore, in the actual control procedure, the fuel pressure will be regulated, in consideration of the relationship of FIG. 17, so that the relationship between the engine revolving speed ne and the fuel spray penetration is as shown in FIG. 16B.

Figure 16A:
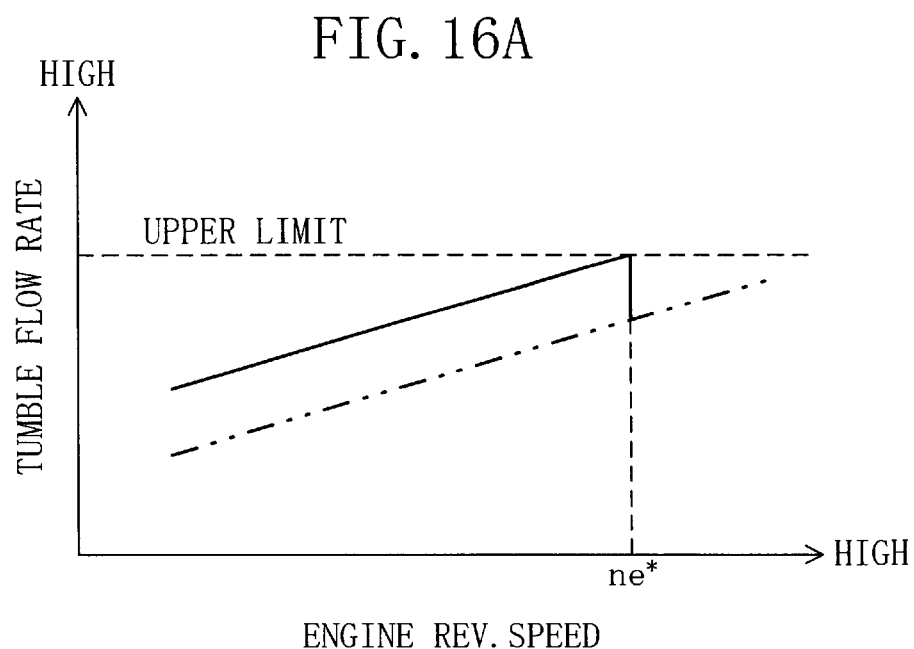
FIG. 16 shows graphs respectively showing the change in the flow rate of the tumble and the penetration of fuel spray in accordance with the engine revolving speed.

It should be noted that the opened position of the TSCV 34 is shown in the imaginary line in FIG. 16A and the closed position thereof is shown in the solid line in the same figure. In other words, in this embodiment, the TSCV 34 is arranged so that it is fully closed in order to raise the tumble flow rate in the stratified-charge combustion zone A while it is fully opened in order to ensure the intake air amount in the homogeneous combustion zone B.

Compensation Control Based on Intake Air Density Conditions

The energy of a tumble T generated in the combustion chamber 6 in the above manner changes depending upon not only its flow rate but also the density conditions of the intake air. The intake air density changes with the temperature of an intake air taken in the combustion chamber 6. For example, if the engine 1 has a tendency to overheat, the intake air temperature becomes higher than its normal temperature and the intake air density correspondingly becomes lower. On the other hand, when the engine 1 is cooled down, the intake air temperature becomes lower and the intake air density correspondingly becomes higher. Such a change in intake air density varies the energy of tumble T so that the tumble T and the fuel spray are thrown out of balance. This invites the inconvenience of making impossible suitable mixture stratification as described above to deteriorate the ignitability and combustion quality of the mixture.

Figure 18A:
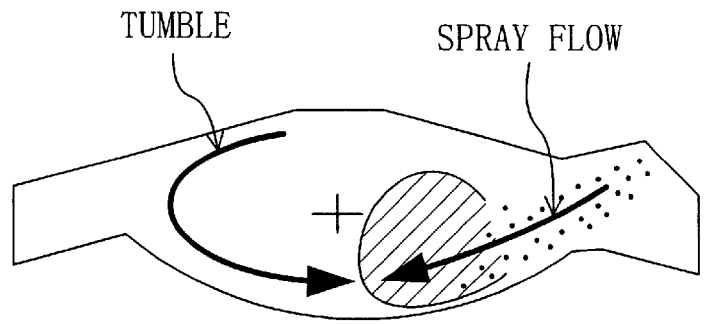
FIG. 18 illustrates both states of a mixture where a fuel spray condition is relatively weak and intense, respectively.

Specifically, for example, when the engine is cooled down and the intake air density is relatively high, the penetration of fuel spray from the injector 18 becomes weak relative to the tumble T. Therefore, as schematically shown in FIG. 18A, the impingement point between the tumble and the fuel spray at the ignition timing for the cylinder 2 is located closer to the injector 18 than the spark plug electrode (indicated in + mark in the figure). As a result, as shown in oblique lines in the figure, a mixture mass does not reach the vicinity of the spark plug 16 electrode so that the ignitability and combustion quality may be impaired.

Figure 18B:
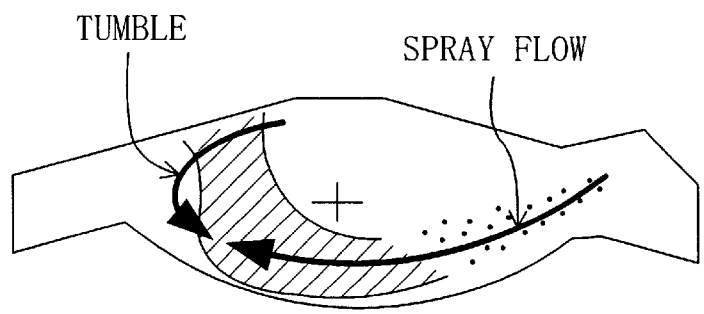

In contrast, when the intake air density is relatively low and the penetration of fuel spray is intense relative to the tumble T, the impingement point between the tumble and the fuel spray at the ignition timing for the cylinder 2 is located, as shown in FIG. 18B, on the side opposite from the injector 18 with respect to the spark plug electrode (left side of the figure). In this case, a mixture mass may pass over the spark plug 16 electrode to diffuse on the exhaust gas side of the combustion chamber 6.

Particularly in the engine 1 of this embodiment, the rate at which the exhaust gas is recirculated to the intake air passage 30, i.e., the EGR rate, is changed depending upon different engine operating conditions. Therefore, the rate at which a high-temperature exhaust gas is recirculated to the intake air taken in the combustion chamber 6 significantly varies to invite extremely great changes in intake air temperature during the running of the engine 1. This may extend the above inconveniences to a very serious problem.

Further, for example, in relatively low atmospheric pressure conditions such as highlands, the energy of tumble T is naturally smaller because of low air densities relative to those of flatlands. Also in this case, it is difficult to provide suitable mixture stratification by simply controlling the fuel injection pressure (fuel pressure) of the injector 18 based on the preset control map in the above manner.

To cope with the above problems, in the engine control, system A of this embodiment, density conditions of the intake air toward the combustion chamber 6 are detected when the engine 1 is in operation, and the target fuel pressure or the target fuel injection timing is compensated based on the detected value. Thus, the fuel spray and the tumble can be prevented from being thrown out of balance thereby providing suitable mixture stratification.

Hereinafter, a specific procedure for compensation control will be described with reference to a flow chart shown in FIG. 1. First, when the program starts, the control system A inputs output signals from the fuel pressure sensor 19a, the airflow sensor 31, the intake air temperature sensor 46, the atmospheric pressure sensor 47, the accel opening sensor 51, the revolving speed sensor 52 and the like in Step SB1. Subsequently, in Step SB2, based on an intake air temperature thae detected by the intake air temperature sensor 46 and the atmospheric pressure atp, a density ganmap of the intake air to be taken in the combustion chamber 6 (hereinafter, referred to as an actual port intake air density) is calculated from the following equation (1):

$$ganmap = ganmap0 \times atp / atp0 \times 273 / (273 + thae) \quad (1)$$

wherein ganmap0 indicates the density of the air in normal conditions, atp0 indicates the pressure thereof, and 273 indicates the absolute temperature (K) thereof. In this manner, the actual port intake air temperature ganmap can precisely be calculated based on the detected intake air temperature thae and atmospheric pressure atp. In addition, since the intake air temperature ganmap detected is an intake air temperature at a portion of the intake air passage 30 downstream from the connecting point with the EGR passage 43, precise detection can be made including the influence of a high-temperature EGR gas.

Next, in Step SB3, it is determined whether the engine 1 is in the stratified-charge combustion mode. If the determination is NO indicating that it is not in the stratified-charge combustion mode, the program proceeds with Step SB4 in which, a reference value ganmap* of the intake air density corresponding to the current operating conditions (hereinafter, referred to as a reference port intake air density) is calculated based on the target load Pi and the engine revolving speed ne. The reference port intake air densities ganmap* are applied when the engine 1 is in steady operating conditions at atmospheric pressure after the warming-up and when the exhaust gas is recirculated at the EGR rate corresponding to the current operating conditions, are previously experimentally set to accommodate for different target loads Pi and engine revolving speeds ne, and are electronically stored as a map in the memory of the ECU 50.

In other words, the memory of the ECU 50 constitutes a reference intake air density storage means in which reference values for density conditions of the intake air are stored in correspondence with the various engine operating conditions and, in Step SB4, reads out of the map a value corresponding to the current target load Pi and current engine revolving speed ne.

Subsequently, in Step SB5, based on the actual port intake air density ganmap obtained in Step SB2 and the reference port intake air density ganmap* obtained in Step SB3, an intake air density ratio ganmap-ratio, which is the ratio of the actual port intake air density ganmap to the reference port intake air density ganmap*, is calculated from the following equation (2):

$$ganmap\text{-}ratio = ganmap / ganmap^* \quad (2)$$

Then, in Step SB6, an amount of compensation for the fuel injection pressure (fuel pressure compensation amount) of the injector 18 is calculated in accordance with the intake air density ratio ganmap-ratio obtained in Step SB5. This fuel pressure compensation amount is used for changing the penetration of fuel spray taking into account a variation in the energy of tumble T with a change in intake air density ganmap, and more specifically for compensatorily modifying the target fuel pressure to a lower value at an intake air density ratio smaller than 1 while compensatorily modifying the target fuel pressure to a higher value at an intake air density ratio larger than 1. In other words, when the intake air density ganmap is lower than the reference port intake air density ganmap*, the target fuel pressure is compensatorily modified to a lower value. On the contrary, when the intake air density ganmap is higher than the reference port intake air density ganmap*, the target fuel pressure is compensatorily modified to a higher value. Further, in this embodiment, optimal values for the fuel pressure compensation amounts corresponding to the respective intake air density ratios ganmap-ratio are previously experimentally obtained and stored as a table. This table is electronically stored in the memory of the ECU 50.

Since the fuel pressure compensation amount is determined in accordance with the intake air density ratio ganmap-ratio in the above manner, it can be determined in accordance with the degree of unbalance between the tumble and the fuel spray in the combustion chamber 6 of each cylinder 2. This suitably eliminates the unbalance in just proportions. In other words, in this embodiment, the intake air density ratio ganmap-ratio is employed as a value for the difference between the actual port intake air density ganmap (detected value for an intake air density) and the reference port intake air density ganmap* (reference value), and the fuel pressure is compensated in accordance with the intake air density ratio ganmap-ratio. Alternatively, in place of the intake air density ratio ganmap-ratio, the deviation between the actual port intake air density ganmap and the reference port intake air density ganmap* may be employed. In this case, the deviation is referred to for example as an intake air density deviation ganmap-dev. (=ganmap*−ganmap). If the intake air density deviation ganamap-dev. is greater than α (α is a positive value set at the vicinity of 0), the intake air density ganmap is determined to be lower than the reference port intake air density ganmap* and the target fuel pressure is thereby modified to the lower pressure side. If the intake air density deviation ganamap-dev. is greater than −α, the intake air density ganmap is determined to be higher than the reference port intake air density ganmap* and the target fuel pressure is thereby modified to the higher pressure side.

In Step SB7 subsequent to Step SB6, the deviation between the target fuel pressure modified based on the fuel pressure compensation amount calculated in Step SB6 and the detected value of the fuel pressure sensor 19a is determined, and the amount of compensation for the fuel injection timing (injection timing compensation amount) is calculated based on the above fuel pressure deviation and the intake air density ratio ganmap–ratio. Specifically, optimal values for the injection timing compensation amount are previously experimentally determined in correspondence with the fuel pressure deviation and the intake air density ratio ganmap–ratio, previously stored as a map in the memory of the ECU 50, and read out of the map. On this map, the injection timing compensation amount is set so that when the intake air density ratio ganmap–ratio<1 (the intake air density ganmap is lower than the reference port intake air density ganmap*), the fuel injection timing is compensated to the retard side, and that when the intake air density ratio ganmap–ratio>1 (the intake air density ganmap is higher than the reference port intake air density ganmap*), the fuel injection timing is compensated to the advance side. In addition, on the map, the injection timing compensation amount is set to be larger as the fuel pressure compensation amount is increased and set at 0 when the fuel pressure compensation amount is equal to or less than a predetermined value.

The above combination of the fuel pressure compensation and the fuel injection timing compensation is made by considering that an actual modification in fuel pressure is made with a relatively large delay in response, and intends to block transient deterioration in ignitability and combustion quality of the mixture by compensating the fuel injection timing until the fuel pressure has reached the modified target value. Specifically, for example, even if the fuel spray penetration is relatively weak, a mixture can reach the vicinity of the spark plug 16 electrode at a desired timing by injecting a fuel early in a manner to advance the fuel injection timing. On the other hand, if the fuel spray penetration is relatively intense, a mixture can reach the vicinity of the spark plug 16 electrode at a desired timing by retarding the fuel injection timing.

Then, in Step SB8, the fuel pressure compensation amount obtained in Step SB6 and the injection timing compensation amount obtained in Step SB7 are reflected on basic controls for the fuel pressure and the fuel injection timing, respectively. Specifically, a reference target fuel pressure read out of the map in Step SA7 in a flow chart of FIG. 10 is modified by the fuel pressure compensation amount, and the modified value is set as a new target fuel pressure. Further, the injection timing read out of the map in Step SA8 is modified by the injection timing compensation amount, and the modified value is set as a new target injection timing. Then, the program returns.

Figure 1:
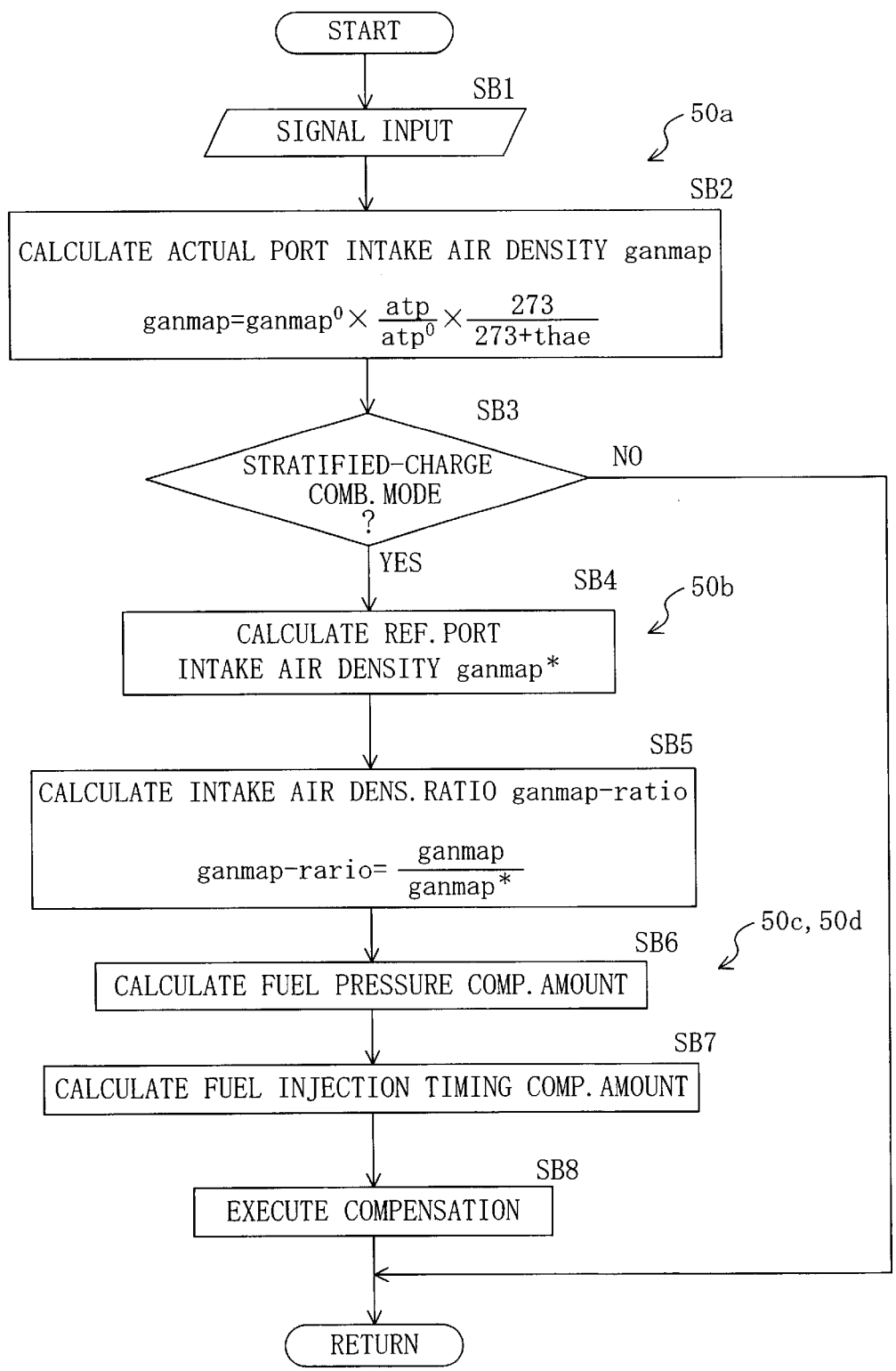
FIG. 1 is a flow chart showing a procedure for compensation control according to an embodiment of the present invention.

In the compensation control flow shown in FIG. 1, Steps SB1 and SB2 constitute an intake air density detecting means 50a for detecting density conditions of the intake air taken in the combustion chamber 6 of the cylinder of the engine 1. Further, the intake air density detecting means 50a detects the intake air temperature thae based on a signal output from the intake air temperature sensor 46 which is disposed at a portion of the intake air passage 30 downstream from the connecting point with the EGR passage 43, detects the atmospheric pressure atp based on a signal output from the atmospheric pressure sensor 47, and calculates the actual port intake air density ganmap based on both the detected values.

Furthermore, Steps SB4 and SB5 in the above flow chart constitute a comparison means 50b for comparing the actual port intake air density ganmap detected by the intake air density detecting means 50a with the reference port intake air density ganmap*. This comparison means 50b reads out the reference port intake air density ganmap*, which corresponds to the current operating conditions of the engine 1, from the memory (reference intake air density storage means) of the ECU 50, and calculates the intake air density ratio ganmap–ratio.

Further, Steps SB6 to SB8 in the flow chart constitute a compensation control means 50c which is configured, when the actual port intake air density ganmap detected by the intake air density detecting means 50a is lower than the reference port intake air density ganmap*, to compensate the fuel injection pressure of the injector 18 to a smaller value and compensate the fuel injection timing to the retard side. Particularly, Steps SB6 and SB7 correspond to a compensation amount setting means 50d for setting the fuel pressure compensation amount and the injection timing compensation amount based on the intake air density ratio ganmap–ratio (comparison result) calculated by the comparison means 50b.

Furthermore, as shown in each of Steps SB6 to SB8, the ECU 50 compensates the fuel injection timing until the actual fuel pressure has reached the modified target value through the compensation control for fuel pressure.

Engine Stratified-charge Combustion Operation

Next, description will be made about the stratified-charge combustion operation of the engine 1 according to the present embodiment.

In the stratified-charge combustion zone A of the engine 1, when the piston 5 moves down from the top dead center during such an intake stroke of the cylinder 2 as shown in FIG. 11, an intake air flows into the combustion chamber 6 through a clearance between the valve head of the intake valve 12 in open position and the opening end of the intake port 10 so that a tumble T is generated as shown in the arrow in the figure. In detail, the intake air taken in the combustion chamber 6 through the downward movement of the piston 5 flows into the combustion chamber 6 mainly through portion of the opening end of the intake port 10 closer to the spark plug 16. With further downward movement of the piston 5, the intake air flows downward along the cylinder inner periphery on the exhaust side (left-hand side of the figure), is turned to the intake side (right-hand side of the figure) along the piston 5 crown surface, and then flows upward thereby forming a tumble T longitudinally widely swirling over the entire combustion chamber 6.

Subsequently, the cylinder 2 shifts to the compression stroke. During this stroke, when the piston 5 moves up from the bottom dead center, the volume of the combustion chamber 6 is reduced by the upward movement of the piston 5 and the tumble T is thus pressed in a compact shape. The flow rate of the tumble T is gradually decreased. In this case, also after the middle stage of the compression stroke of the cylinder 2, the combustion chamber space of suitable size and form is left between the pent-roof type combustion chamber 6 ceiling and the cavity 5a of the piston 5 crown surface, and therefore the tumble T is not collapsed but retained up to the middle and later stages of the compression stroke of the cylinder 2. At the time, the partial tumble T flowing along the piston 5 crown surface from exhaust to intake side (from left- to right-hand side of the figure) turns backward near to the injection nozzle of the injector 18 and then flows along the combustion chamber 6 ceiling from intake to exhaust side. Particularly, the partial tumble flowing along the piston 5 crown surface is guided along the cavity 5a of the piston 5 crown surface to flow toward the injection nozzle of the injector 18.

Figure 13:
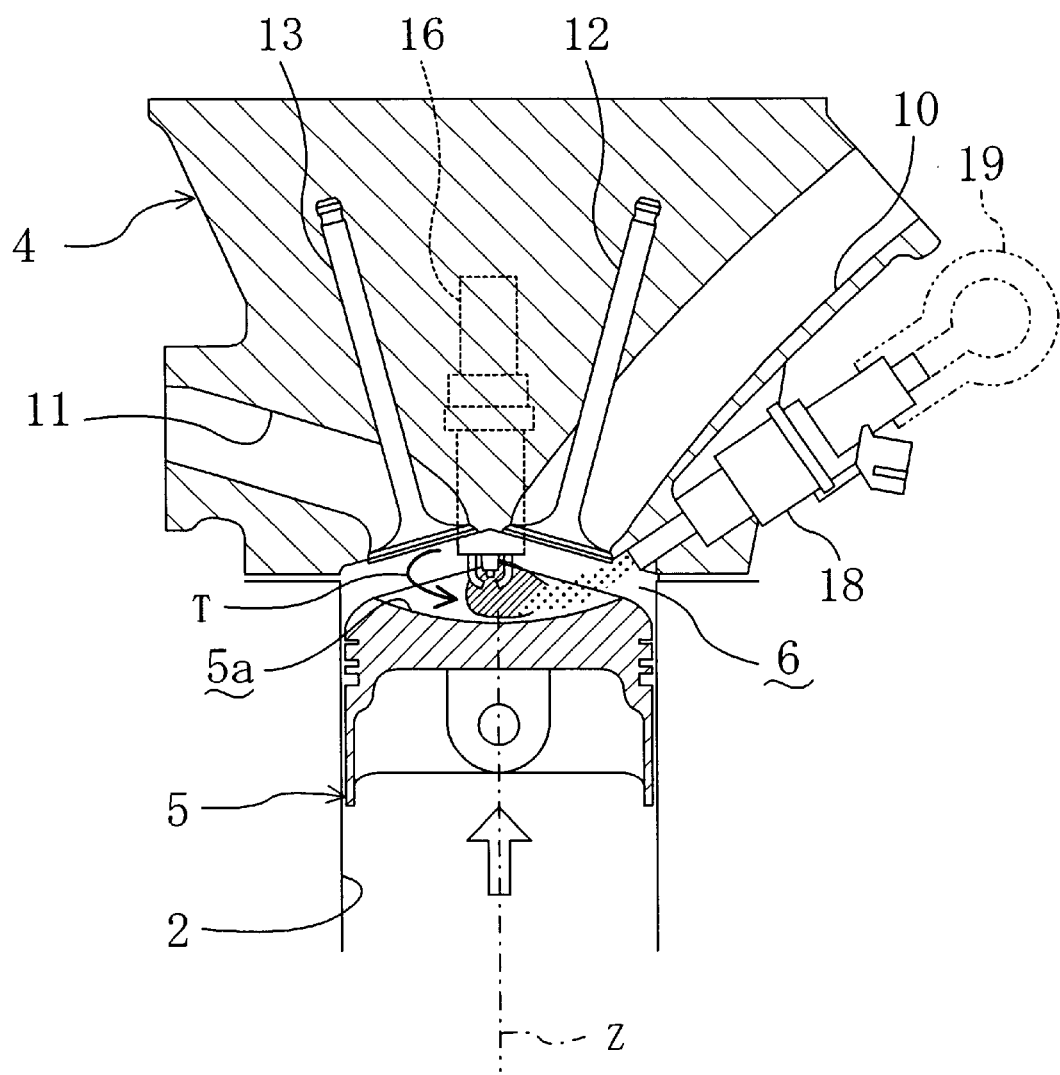
FIG. 13 is a view illustrating how the mixture stays in the vicinity of the spark plug electrode at the ignition timing for the cylinder.

As shown in FIG. 12, when a fuel is injected by the injector 18, the major part of the fuel spray impinges substantially oppositely against intense partial flow of the tumble T flowing along the cavity 5a of the piston 5 crown surface. Thereby, carburetion of fuel droplets and mixture thereof with the ambient air are promoted, and the fuel spray is gradually reduced in speed while advancing to push away the tumble T so that a flammable mixture layer of suitable concentration is formed around the spark plug 16 electrode at the ignition timing for the cylinder 2 as shown in FIG. 13. During the time, squishes flowing from outside of the cavity 5a toward the cylinder center suppress diffusion of the flammable mixture layer. In this state, electricity is conducted to the spark plug 16 so that the flammable mixture layer is ignited.

To implement the above-mentioned mixture stratification around the spark plug 16 regardless of operating conditions of the engine 1, the fuel injection pressure (fuel pressure) of the injector 18 is controlled basically in accordance with the current operating conditions of the engine 1 (see FIG. 16). As a result, the fuel spray penetration is adjusted to generally accord with the flow rate of the tumble T.

Further, the actual port intake air density ganmap is calculated based on the intake air temperature thae and the atmospheric pressure atp. If the actual port intake air density ganmap is higher than the reference port intake air density ganmap*, the fuel pressure is augmentatively compensated in accordance with a rise in the energy of the tumble T due to the relatively elevated actual port intake air density ganmap. On the other hand, if the actual port intake air density ganmap is lower than the reference port intake air density ganmap*, the fuel pressure is reductively compensated in accordance with a drop in the energy of the tumble T due to the relatively reduced actual port intake air density ganmap.

In this manner, even if the density conditions of the intake air is deviated from the reference conditions, it can be prevented that the tumble T and the fuel spray are thrown out of balance due to such deviation, which provides suitable mixture stratification as initially intended. Additionally, in this case, since the fuel pressure compensation amount is determined in accordance with the intake air density ratio ganmap-ratio, the degree of compensation can be adjusted to accord with the degree of unbalance between the tumble and the fuel spray, which provides suitable compensation control in just proportions.

In augmentatively or reductively compensating the fuel pressure, particularly in augmentatively compensating it, there exists a relatively large delay before the fuel pressure actually reaches the target fuel pressure. During the time, the fuel injection timing is compensated to the advance side or retard side to prevent the tumble and the fuel spray from being thrown out of balance. It can be thereby prevented that the ignitability and combustion quality of the mixture are transiently deteriorated by a change in the operating conditions of the engine 1.

As described so far, the control system A according to this embodiment is intended for the in-cylinder direct injection engine 1 in which a tumble T is generated to flow toward the injector 18 in the combustion chamber 6 of the cylinder during stratified-charge combustion operation of the engine 1 and a fuel is injected against the tumble T so that a flammable mixture which stays in the vicinity of the spark plug 16 electrode is ignited. The present invention focuses on that the energy of tumble T varies depending upon the intake air temperature and the atmospheric pressure, and therefore carries out a delicate compensation control for the fuel pressure or the fuel injection timing to eliminate the above variation. In this manner, the fuel spray and the tumble T can be balanced one against another for each cylinder 2 as initially intended, regardless of changes in operating conditions of the engine 1 and running conditions of the vehicle. This enhances the ignitability and combustion quality of the mixture thereby providing fully improved fuel economy and power output performance.

Other Embodiments

The present invention is not limited to the above embodiment but includes various other embodiments. For example, in the engine control system A of the above embodiment, when the engine 1 is in the stratified-charge combustion zone (A), only the fuel injection pressure is controlled while the TSCV 34 is kept fully closed. However, as shown in FIG. 19, the opening of the TSCV 34 may be also controlled in the stratified-charge combustion zone (A).

Figure 19A:
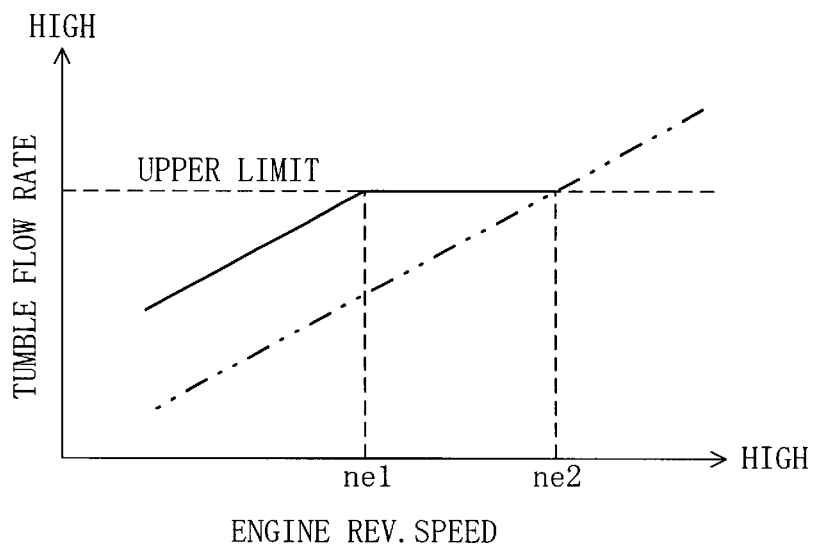
FIG. 19 shows corresponding graphs of FIG. 16 according to another embodiment of the present invention, in which the opening of a tumble swirl control valve is controlled even in stratified-charge combustion zone of the engine.
Figure 19B:
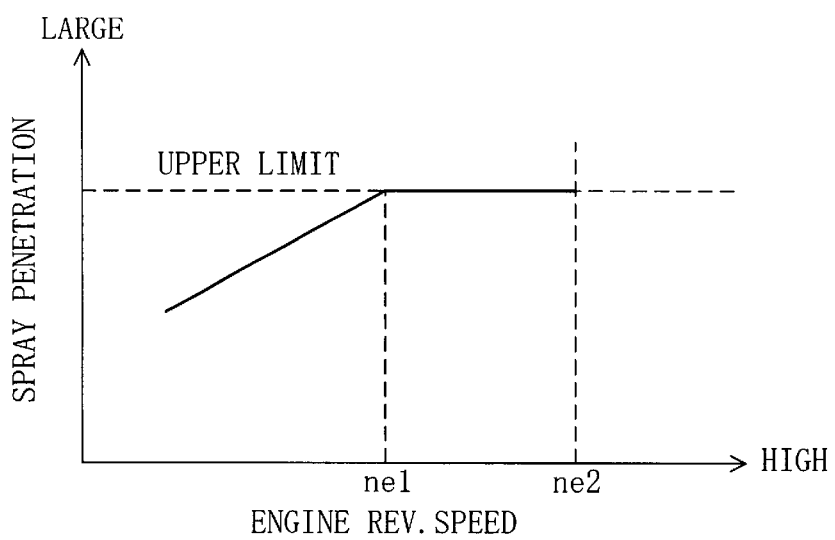

Specifically, as shown in FIG. 19A, when the engine 1 is in the stratified-charge combustion zone and its revolving speed is equal to or smaller than a first set value ne1 (for example, 2500 rpm), the TSCV 34 is fully closed. In this manner, the flow rate of the tumble can be increased as compared with the case where the TSCV 34 is open (shown in an imaginary line in the figure). Next, when the engine revolving speed exceeds the first set value ne1, the TSCV 34 is gradually opened with increase in the engine revolving speed in order that even if the engine revolving speed becomes high, the flow rate of the tumble T is not increased. Then, after the engine revolving speed exceeds a second set value ne2 (for example, 3500 rpm) and the engine 1 shifts to the homogeneous combustion zone, the TSCV 34 is fully opened to ensure the amount of intake air. And, as shown in FIG. 19B, the fuel spray penetration can be changed in accordance with the change in tumble flow rate.

Further, in the above embodiment, the fuel injection pressure or the fuel injection timing of the injector 18 is compensated as a manner for compensation control. However, the manner for compensation control is not limited to the above. For example, the flow rate of the tumble T may be changed by compensation control on the opening of the TSCV 34 as shown in a flow chart of FIG. 20, or alternatively may be changed by combination of these compensation controls.

The above-mentioned exemplary compensation control will be described with reference to the flow chart of FIG. 20. In each of Steps SC1 to SC5 after the start, the same procedure as in each of Steps SB1 to SB5 of the control flow in the above embodiment (see FIG. 1) is carried out. Subsequently, in Step SC6, the amount of compensation for the opening of the TSCV 34 (TSCV compensation amount) is calculated based on the intake air density ratio ganmap-ratio. For this amount of compensation, optimal values corresponding to the intake air density ratios ganmap-ratio are previously experimentally determined and recorded as a table. This table is electronically stored in the memory of the ECU 50.

In the table, the TSCV compensation amount is set so that when ganmap-ratio<1 (the intake air density ganmap is lower than the reference port intake air density ganmap*), the opening of the TSCV becomes relatively small, and that when ganmap-ratio>1 (the intake air density ganmap is higher than the reference port intake air density ganmap*), the opening of the TSCV becomes relatively large. Then, in Step SC7, the injection timing compensation amount is calculated as in Step SB7 of the control flow in the above embodiment. In Step SC8, the TSCV compensation amount and the injection timing compensation amount are reflected on basic controls over the TSCV opening and the fuel injection timing. Thereafter, the program returns.

Figure 20:
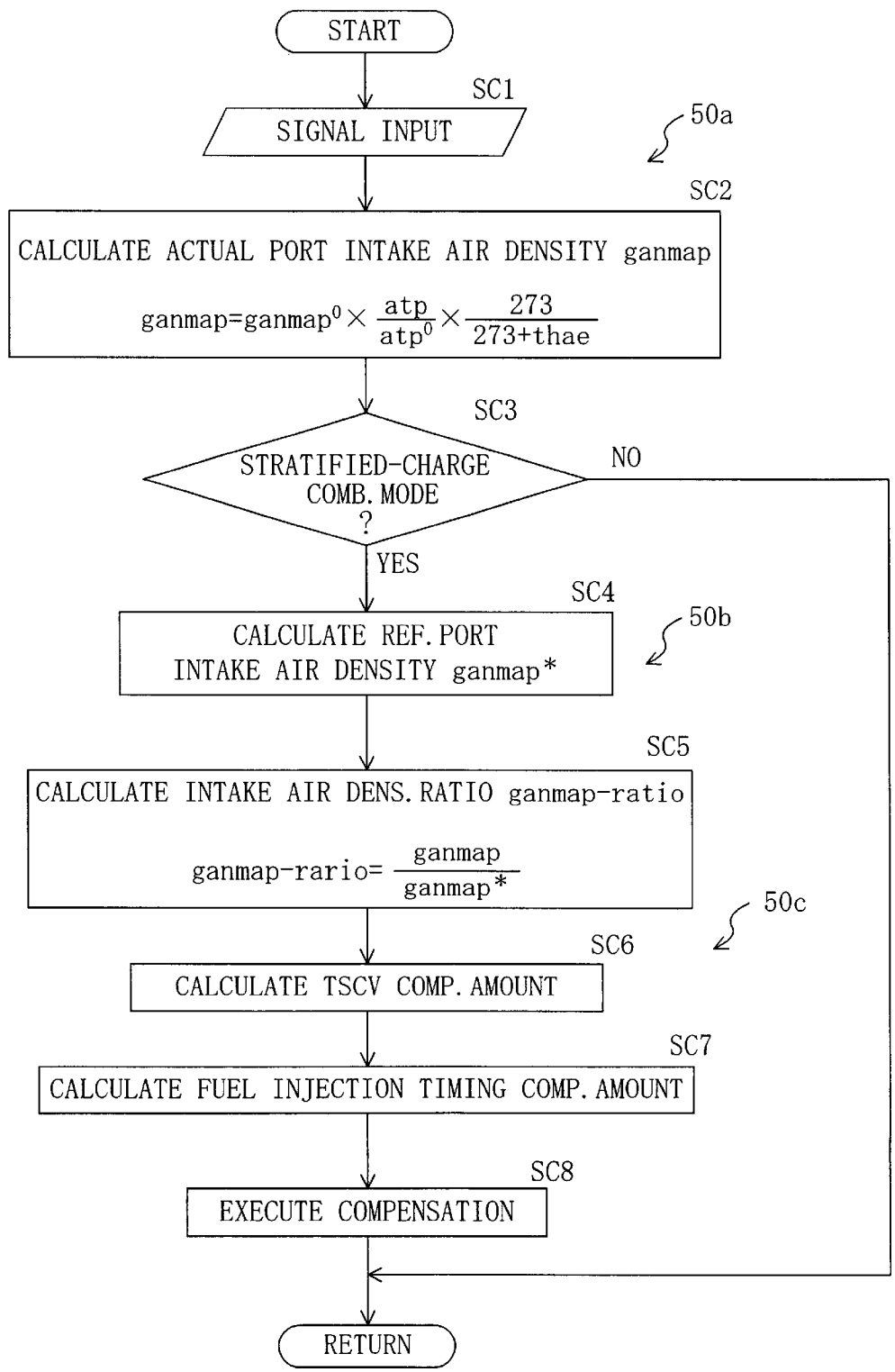
FIG. 20 is a corresponding flow chart of FIG. 1 according to still another embodiment of the invention in which the opening of the tumble swirl control valve is compensated in accordance with the change in density conditions of the intake air.

In the control flow shown in FIG. 20, Steps SC1 and SC2 constitute an intake air density detecting means 50a, Steps SC4 and SC5 constitute a comparison means 50b, and Steps SC6 to SC8 constitute a compensation control means 50c.

In the above embodiment, the actual port intake air density ganmap is calculated based on the intake air temperature thae detected by the intake air temperature sensor 46 and the atmospheric pressure atp, and the actual port intake air density ganmap is compared with the reference port intake air density ganmap*. Alternatively, the detected intake air temperature thae may be compared with the preset reference intake air temperature, and compensation control may be made based on the comparison result. Alternatively, the value detected by the airflow sensor and the detected atmospheric pressure atp may be compared with respective preset reference values, and compensation control may be made based on the comparison results.

Further, because a change in actual EGR rate exerts an extremely large influence on the intake air temperature, the rate at which the exhaust air is recirculated to the intake air passage 30 of the engine 1 (actual EGR rate) may be detected, and compensation control may be made based on the detection result. Specifically, for example, two pressure sensors may be provided to detect a pressure difference across the EGR valve 44, the amount of exhaust gas recirculation may be calculated based on outputs from both the sensors and the opening of the EGR valve 44, and the actual EGR rate may be determined from the calculation result and an amount of fresh air obtained based on the output of the airflow sensor 31.

Furthermore, as the EGR rate is elevated, the intake air temperature becomes higher and the intake air density becomes lower. Therefore, compensation control may be made in a manner to correspondingly increase the tumble flow rate, a manner to correspondingly reduce the fuel pressure, or a manner to correspondingly retard the fuel injection timing. Alternatively, compensation control may be made so that as the EGR rate is decreased, the tumble flow rate is decreased correspondingly, or the fuel pressure is increased correspondingly, or the fuel injection timing is advanced correspondingly.

Further, in the above embodiment, the amount of compensation for the fuel injection timing is calculated any time based on the amount of deviation for the fuel pressure and the intake air density ratio as shown in Step SB7 of the control flow in FIG. 1. However, the way of calculation of the amount of compensation for the fuel injection timing is not limited to the above manner. For example, as shown in a control flow of FIG. 21, the amount of compensation for the fuel injection timing may be calculated under conditions that the deviation between the modified target value for the fuel pressure and the value detected by the fuel pressure sensor 19a is larger than a predetermined value. Specifically, in each of Steps SD1 to SD6 after the start in the control flow of FIG. 21, the same procedure as in each of Steps SB1 to SB6 of the control flow in the above embodiment (see FIG. 1) is carried out, and a modified target fuel pressure is obtained by adding the fuel pressure compensation amount calculated in Step SD6 to the reference target fuel pressure (Execute fuel pressure compensation: Step SD7). Subsequently, in Step SD8, the value detected by the fuel pressure sensor 19a (actual fuel pressure (A.F.P.)) is subtracted from the modified target fuel pressure (T.F.P.). If the absolute value for the value thus obtained is larger than a predetermined value, the program proceeds with Steps SD9 and SD10 in which the target value for the fuel injection timing is compensatorily modified like the above embodiment. Then, the program returns. On the other hand, if the absolute value is equal to or smaller than the predetermined value in Step SD8, the program returns without modifying the target value for the fuel injection timing.

Figure 21:
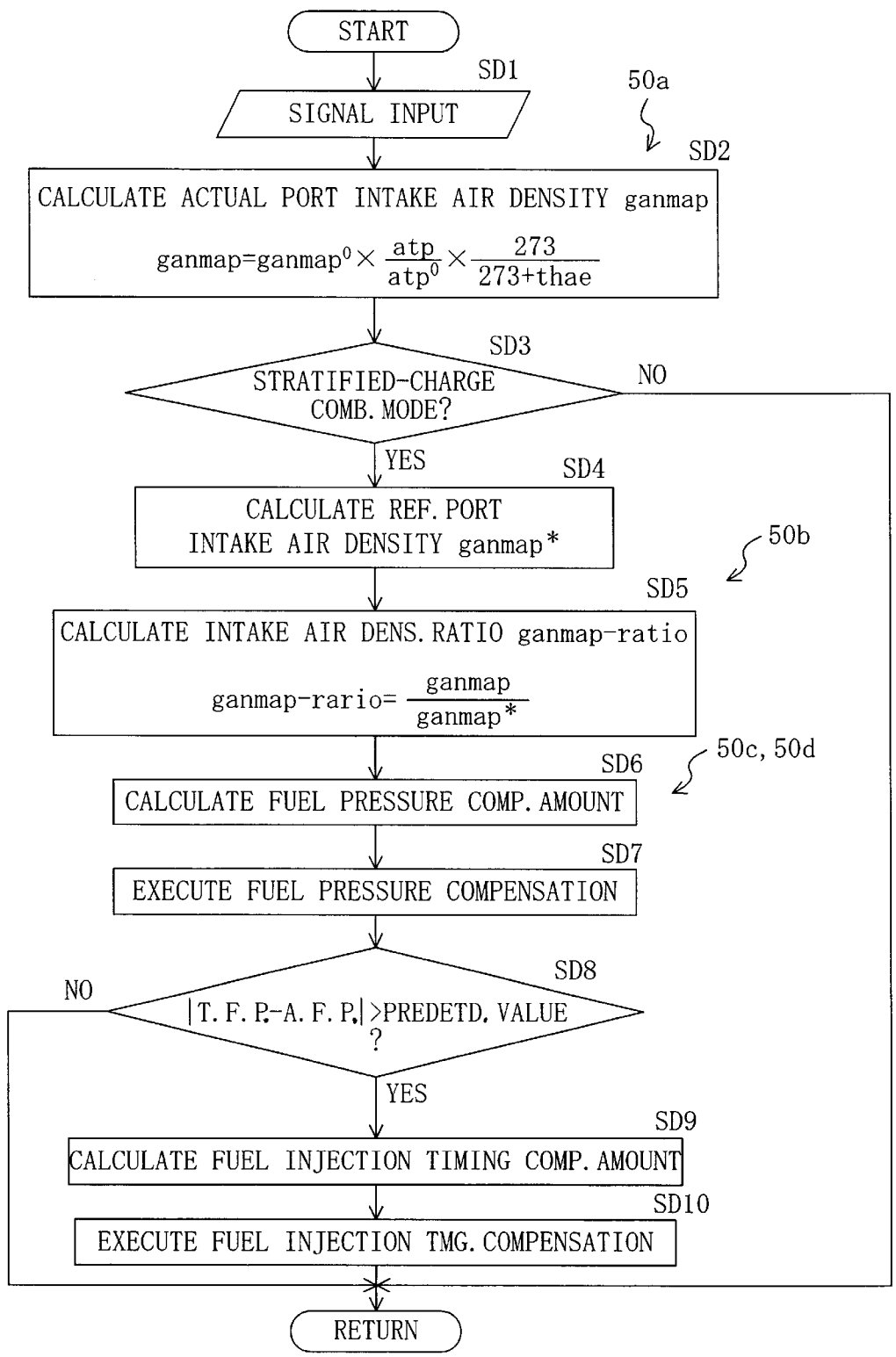
FIG. 21 is a corresponding flow chart of FIG. 1 according to still another embodiment of the invention in which the fuel injection timing is compensated until the deviation between a modified target fuel pressure and an actual fuel pressure has reached a predetermined value or less.

In the control flow shown in FIG. 21, Steps SD1 and SD2 constitute an intake air density detecting means 50a, Steps SD4 and SD5 constitute a comparison means 50b, and Steps SD6 to SD10 constitute a compensation control means 50c.

Further, in the foregoing embodiment, the piston 5 crown surface is formed with a lemon-shaped cavity 5a. However, such a cavity may not necessarily be provided. For example, the piston 5 crown surface may have a flat shape as a whole. Alternatively, a spheric cavity may be provided over the entire piston 5 crown surface.

Figure 22A:
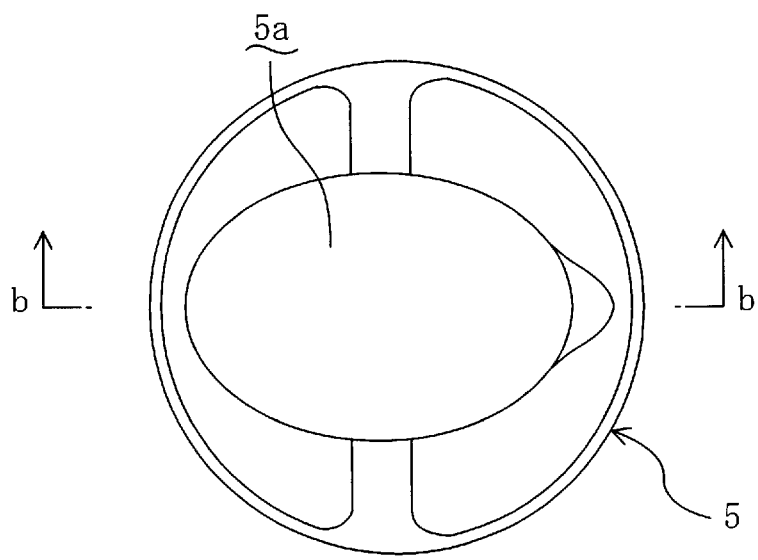
FIG. 22A is an enlarged top view of a piston according to still another embodiment in which the bottom face of a cavity formed in a piston crown surface is inclined.
Figure 22B:
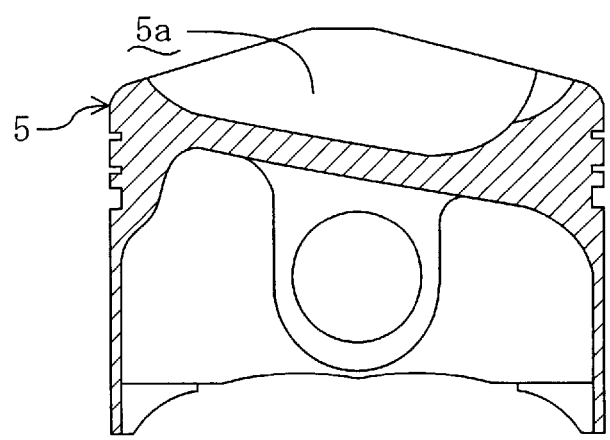
FIG. 22B is a cross-sectional view thereof.

Furthermore, in the case where the piston crown surface is provided with a cavity 5a of such a shape as shown in the above embodiment, the bottom surface of the cavity 5a is preferably formed, as shown in FIG. 22, to tilt toward the intake side of the combustion chamber 6 (right-hand side in the figure). In this case, as shown in FIG. 22B, the bottom surface of the cavity 5a is formed so that its portion located on the intake side of the combustion chamber 6 is inclined to be deeper than its opposite portion located on the exhaust side of the combustion chamber 6. Accordingly, the effects of upward movement of the piston 5 during the compression stroke of the cylinder on the tumble T can be alleviated thereby providing improved retentivity of the tumble T in the combustion chamber 6.

Furthermore, in the above embodiment, the spark plug 16 electrode is located near to the cylinder center line. However, the position of the spark plug 16 electrode is not limited to that position, but it can be located at a position offset on the intake valve side or the exhaust valve side. It should be noted that in such a case, the mixture must be retained in the vicinity of the spark plug 16 electrode at the ignition timing for the cylinder 2. Therefore, it is necessary to change the trade-off level between the flow rate of the tumble T and fuel spray penetration and the relationship between the ignition timing and the fuel injection timing in accordance with the position of the spark plug 16 electrode.

As described above, the control system for an in-cylinder direct injection engine of the present invention can prevent fuel spray and tumble from being thrown out of balance due to a change in intake air temperature or atmospheric pressure thereby stably providing suitable mixture stratification. Therefore, the control system is effective to improvement in fuel consumption ratio and purification of exhaust gas when used as a power plant and contributes to reduction in vibrations and noises.

What is claimed is:

1. A control system for an in-cylinder direct injection engine which includes: a fuel injection valve for directly injecting a fuel into a combustion chamber in a cylinder of an engine; and tumble generating means for generating a tumble in the combustion chamber, in which the fuel is injected against the tumble in the combustion chamber by the fuel injection valve during stratified-charge combustion operation of the engine so that a flammable mixture stays in the vicinity of an electrode of a spark plug at the ignition timing for the cylinder, the control system further comprising:

intake air density detecting means for detecting a value for density conditions of an intake air taken in the combustion chamber;

revolving speed detecting means for detecting the revolving speed of the engine;

intake air flow control means for controlling the flow rate of the tumble in the combustion chamber;

fuel pressure control means for controlling the fuel injection pressure of the fuel injection valve; and control means for controlling the fuel injection valve, the intake air flow control means and the fuel pressure control means based on a value detected by at least one of the intake air density detecting means and the revolving speed detecting means, wherein the control means sets based on at least the engine revolving speed respective reference target values of the tumble flow rate, fuel injection pressure and fuel injection timing that correspond to the case where the value for density conditions of the intake air is equal to a preset reference value, and the control means compensatorily modifies at least one of the reference target values based on a value for the difference between the value detected by the intake air density detecting means and the reference value.

2. The engine control system of claim 1, wherein when the value detected by the intake air density detecting means is a value indicating a lower density than the reference value, the control means compensatorily modifies at least one of the target values for the tumble flow rate, the fuel injection pressure and the fuel injection timing to reduce the influence of an energy drop of the tumble.

3. The engine control system of claim 1, wherein the intake air density detecting means detects at least one of the intake air temperature, the atmospheric pressure and the rate at which an exhaust gas is recirculated to an intake system.

4. The engine control system of claim 1, wherein an intake air passage of the engine is connected with an end of an exhaust gas recirculation passage for recirculating part of the exhaust gas from an exhaust system to an intake system, and the intake air density detecting means is configured to detect temperature conditions of the intake air downstream from a connecting point with the exhaust gas recirculation passage.

5. The engine control system of claim 1, further comprising:

reference intake air density storage means in which reference values for density conditions of the intake air are stored in correspondence with different operating conditions of the engine;

comparison means for comparing the reference value stored in the reference intake air density storage means with the value detected by the intake air density detecting means; and compensation amount setting means for setting an amount of compensation for at least one of the tumble flow rate, the fuel injection pressure and the fuel injection timing based on the comparison result of the comparison means.

6. The engine control system of claim 2, wherein the control means is configured to compensatorily modify the target value of the tumble flow rate to a larger value than the reference target value thereof when the detected value of the intake density detecting means indicates a lower density than the reference value.

7. The engine control system of claim 2, wherein the control means is configured to compensatorily modify the target value of the fuel injection pressure to a smaller value than the reference target value thereof when the detected value of the intake density detecting means indicates a lower density than the reference value.

8. The engine control system of claim 7, further comprising fuel pressure detecting means for detecting the fuel injection pressure of the fuel injector, and wherein the control means is configured to compensate the fuel injection timing of the fuel injector to the retard side until the deviation between the modified target value of the fuel injection pressure and the detected value of the fuel pressure detecting means has reached a predetermined value or less.

9. The engine control system of claim 2, wherein the control means is configured to compensatorily modify the target value of the fuel injection timing to the retard side with respect to the reference target value when the detected value of the intake density detecting means indicates a lower density than the reference value.

10. The engine control system of claim 1, wherein when the detected value of the intake air density detecting means indicates a higher density than the reference value, the control means compensatorily modifies at least one of the target values for the tumble flow rate, the fuel injection pressure and the fuel injection timing to reduce the influence of an energy rise of the tumble.

11. The engine control system of claim 10, wherein the control means is configured to compensatorily modify the target value of the tumble flow rate to a smaller value than the reference target value thereof when the detected value of the intake air density detecting means indicates a higher density than the reference value.

12. The engine control system of claim 10, wherein the control means is configured to compensatorily modify the target value of the fuel injection pressure to a larger value than the reference target value thereof when the detected value of the intake density detecting means indicates a higher density than the reference value.

13. The engine control system of claim 12, further comprising fuel pressure detecting means for detecting the fuel injection pressure of the fuel injector, and wherein the control means is configured to compensate the fuel injection timing of the fuel injector to the advance side until the deviation between the modified target value of the fuel injection pressure and the detected value of the fuel pressure detecting means has reached a predetermined value or less.

14. The engine control system of claim 10, wherein the control means is configured to compensatorily modify the target value of the fuel injection timing to the advance side with respect to the reference target value when the detected value of the intake density detecting means indicates a higher density than the reference value.

15. An in-cylinder direct injection engine system comprising:

an intake port capable of generating a tumble in a combustion chamber of an engine;

a fuel injection valve for injecting a fuel against the tumble in the combustion chamber during a compression stroke of the cylinder;

an intake air temperature sensor for detecting the temperature of an intake air taken in the combustion chamber;

an atmospheric pressure sensor for detecting the atmospheric pressure;

a revolving speed sensor for detecting the revolving speed of the engine;

an intake air flow control valve for controlling the flow rate of the tumble flowing in the combustion chamber;

a regulator for regulating the fuel pressure of the fuel to be supplied to the fuel injection valve; and a control unit for controlling the opening of the intake air flow control valve, and the fuel injection timing and fuel pressure of the fuel injection valve based on a signal output from at least one of the revolving speed sensor, the intake air temperature sensor and the atmospheric pressure sensor, wherein the control unit sets based on at least the engine revolving speed respective reference target values of the tumble flow rate, fuel injection pressure and fuel injection timing that correspond to the case where a value for density conditions of the intake air is equal to a preset reference value, and the control unit calculates the intake air density based on the detected values of the intake air temperature sensor and the atmospheric pressure sensor, and compensatorily modifies at least one of the reference target values based on a value for the difference between the calculated value for the intake air density and the reference value.

16. The in-cylinder direct injection engine system of claim 15, wherein when the calculated value for the intake air density indicates a lower density than the reference value, the control unit compensatorily modifies at least one of the target values for the tumble flow rate, the fuel injection pressure and the fuel injection timing to reduce the influence of an energy drop of the tumble, and wherein when the calculated value for the intake air density indicates a higher density than the reference value, the control unit compensatorily modifies at least one of the target values for the tumble flow rate, the fuel injection pressure and the fuel injection timing to reduce the influence of an energy rise of the tumble.

* * * * *